United States Patent
Yamashita et al.

(10) Patent No.: US 11,462,742 B2
(45) Date of Patent: Oct. 4, 2022

(54) ELECTRODE, SECONDARY BATTERY, BATTERY PACK, VEHICLE, AND STATIONARY POWER SUPPLY

(71) Applicant: KABUSHIKI KAISHA TOSHIBA, Minato-ku (JP)

(72) Inventors: Yasunobu Yamashita, Tokyo (JP); Shinsuke Matsuno, Tokyo (JP); Norio Takami, Yokohama (JP); Hiroki Inagaki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 161 days.

(21) Appl. No.: 16/804,355

(22) Filed: Feb. 28, 2020

(65) Prior Publication Data
US 2020/0203731 A1  Jun. 25, 2020

Related U.S. Application Data

(63) Continuation of application No. PCT/JP2019/010984, filed on Mar. 15, 2019.

(30) Foreign Application Priority Data

Sep. 19, 2018 (JP) .............................. JP2018-175271
Mar. 14, 2019 (JP) .............................. JP2019-047013

(51) Int. Cl.
*H01M 14/00* (2006.01)
*H01M 4/62* (2006.01)
(Continued)

(52) U.S. Cl.
CPC ............ *H01M 4/628* (2013.01); *H01M 4/366* (2013.01); *H01M 4/667* (2013.01); *H01M 10/425* (2013.01); *H01M 2010/4271* (2013.01)

(58) Field of Classification Search
CPC ...... H01M 4/628; H01M 4/624; H01M 4/623; H01M 4/366; H01M 4/667; H01M 4/666; H01M 10/425; H01M 2010/4271
See application file for complete search history.

(56) References Cited

U.S. PATENT DOCUMENTS 9,252,421 B1   2/2016 Erickson et al.
2003/0186123 A1* 10/2003 Maddanimath ........ B82Y 30/00
                                              429/213
(Continued)

FOREIGN PATENT DOCUMENTS

JP    2008-153053 A    7/2008
JP    4826199 B2       11/2011
(Continued)

OTHER PUBLICATIONS

Abstract of CN 102130323, Liu et al, "Lithium ion battery film cathode comprises surface coating formed by compounding high capacity nano particles in directional porous polymer elastomer", published Feb. 13, 2013.*

(Continued)

*Primary Examiner* — Raymond Alejandro
(74) *Attorney, Agent, or Firm* — Oblon, McClelland, Maier & Neustadt, L.L.P.

(57) ABSTRACT

According to one embodiment, an electrode is provided. The electrode includes a current collector, an electrode mixture layer, and a self-assembled film. The first self-assembled film covers at least a part of a surface of the current collector. The first self-assembled film contains organic molecules. The electrode mixture layer disposed on at least a part of the first self-assembled film.

20 Claims, 9 Drawing Sheets

(51) Int. Cl.
*H01M 4/66* (2006.01)
*H01M 10/42* (2006.01)
*H01M 4/36* (2006.01)

(56) References Cited

U.S. PATENT DOCUMENTS

| | | | |
|---|---|---|---|
| 2009/0305061 A1* | 12/2009 | Ishihara | C23C 18/1893 |
| | | | 428/446 |
| 2010/0255382 A1 | 10/2010 | Kim et al. | |
| 2014/0170489 A1 | 6/2014 | Matsushima et al. | |
| 2014/0346048 A1* | 11/2014 | Kohiki | C25D 7/0614 |
| | | | 205/50 |
| 2015/0017530 A1 | 1/2015 | Ahn et al. | |
| 2019/0027741 A1 | 1/2019 | Maeda et al. | |

FOREIGN PATENT DOCUMENTS

| | | |
|---|---|---|
| JP | 2013-152825 A | 8/2013 |
| JP | 2013-152937 A | 8/2013 |
| JP | 2016-177981 A | 10/2016 |
| JP | 2017-10923 A | 1/2017 |
| JP | 6150084 B2 | 6/2017 |
| JP | 2017-183101 A | 10/2017 |
| WO | WO 2012/049967 A1 | 4/2012 |
| WO | WO 2018/123238 A1 | 7/2018 |

OTHER PUBLICATIONS

International Search Report dated Jul. 15, 2019 in PCT/JP2019/010984 filed Mar. 15, 2019, 7 pages.
Written Opinion dated Jul. 15, 2019 in PCT/JP2019/010984 filed Mar. 15, 2019, 14 pages.

* cited by examiner

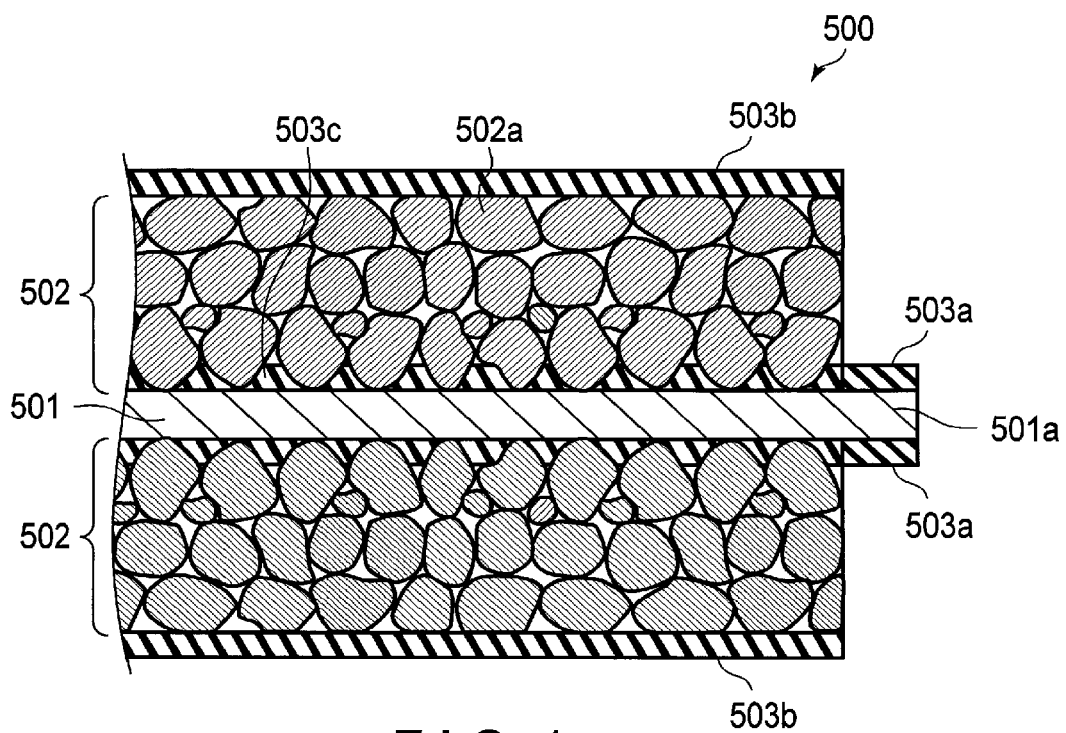
F I G. 1
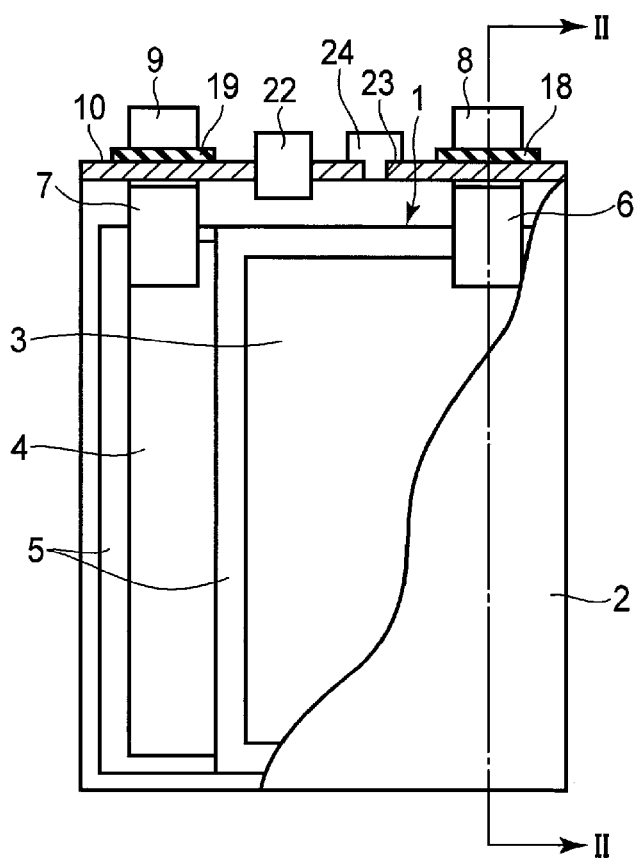
F I G. 2

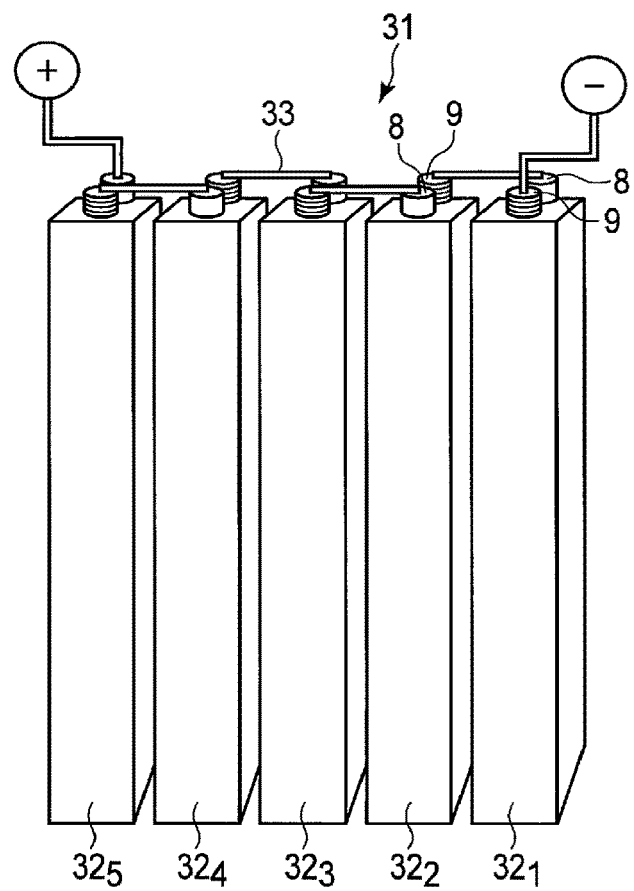
F I G. 6
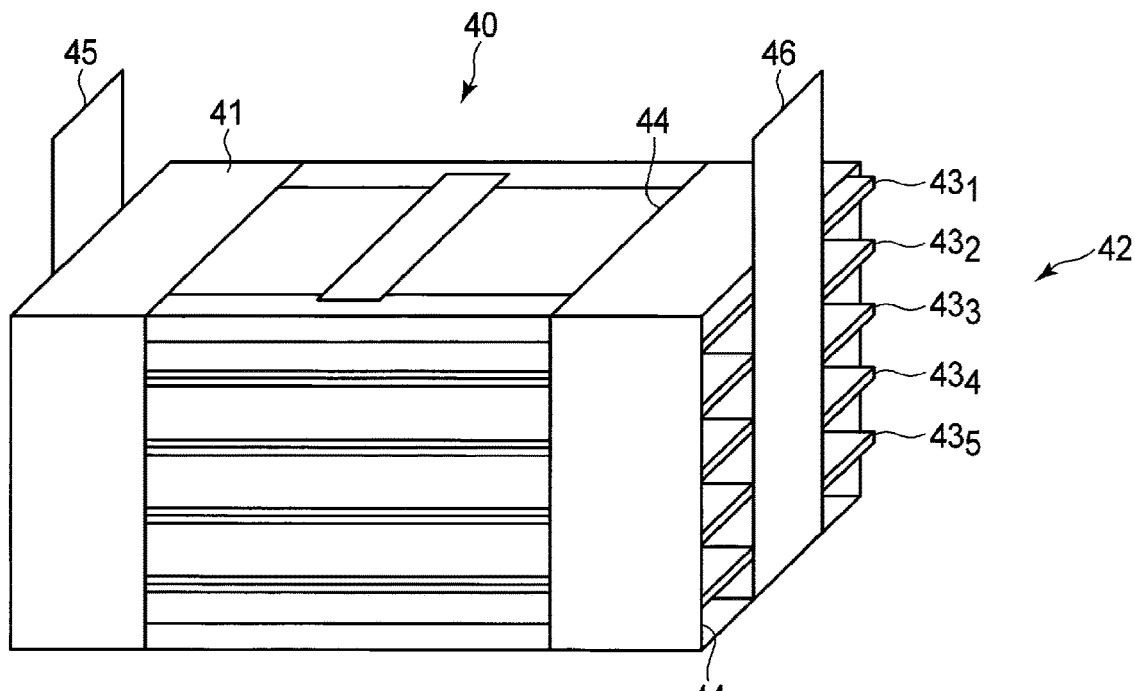
F I G. 7

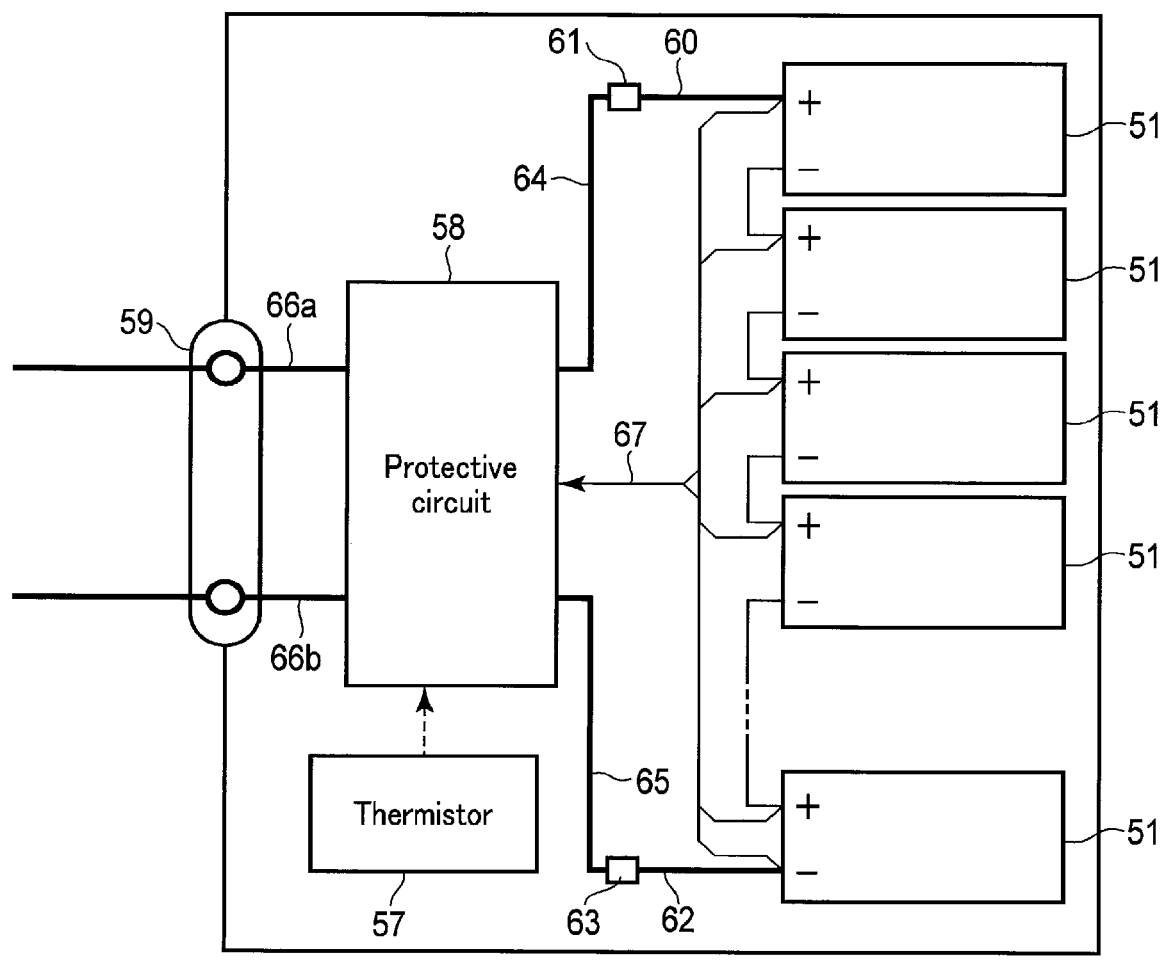
F I G. 9

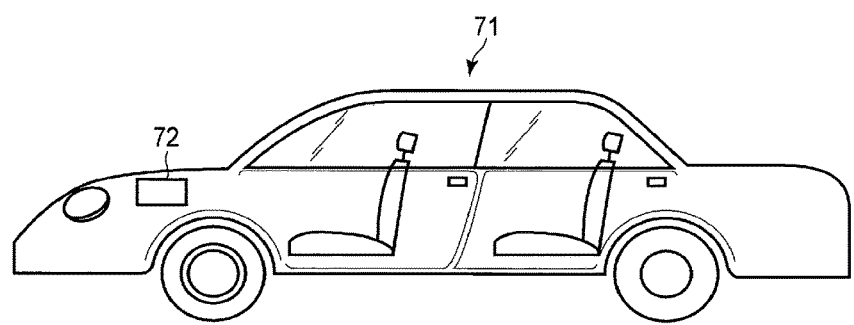
F I G. 10

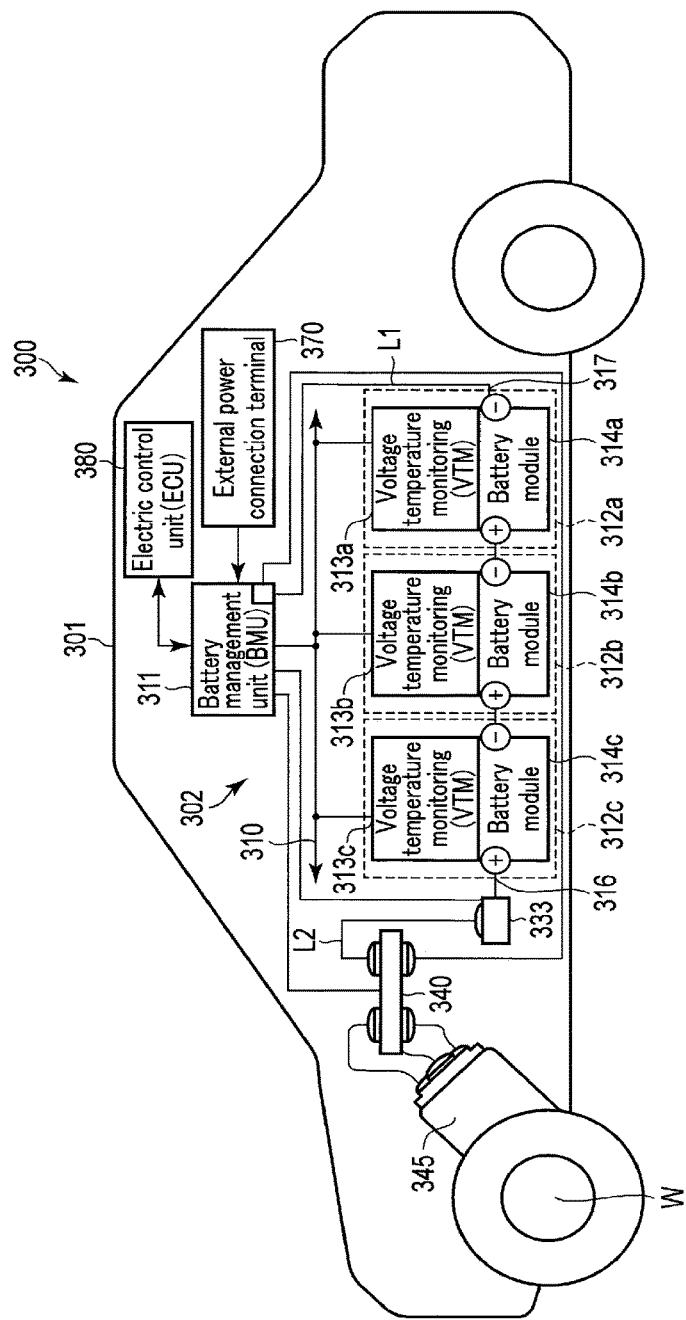
F I G. 11

ELECTRODE, SECONDARY BATTERY, BATTERY PACK, VEHICLE, AND STATIONARY POWER SUPPLY

CROSS-REFERENCE TO RELATED APPLICATIONS

This application is a Continuation application of PCT Application No. PCT/JP2019/010984, filed Mar. 15, 2019 and based upon and claims the benefit of priority from Japanese Patent Application No. 2018-175271, filed Sep. 19, 2018, and Japanese Patent Application No. 2019-047013, filed Mar. 14, 2019, the entire contents of all of which are incorporated herein by reference.

FIELD

Embodiments described herein relate generally to an electrode, a secondary battery, a battery pack, a vehicle, and a stationary power supply.

BACKGROUND

Nonaqueous electrolyte batteries, in which a carbon material or a lithium-titanium oxide is used as a negative electrode active material and a layered oxide including nickel, cobalt, manganese, and the like is used as a positive electrode active material, secondary batteries in particular, have already been put to practical use as a power source in a wide range of fields. Modes of such nonaqueous electrolyte batteries span over far ranges from small-sized batteries for various electronic devices to large-sized batteries for electric automobiles and the like. In an electrolyte for such secondary batteries, unlike a nickel-hydrogen battery or a lead storage battery, used is a nonaqueous organic solvent, in which ethylene carbonate, methyl ethyl carbonate, and the like are mixed. The electrolyte using such a solvent has oxidation resistance and reduction resistance that are higher than those of an aqueous electrolyte, and thus electrolysis of the solvent hardly occurs. For that reason, the nonaqueous secondary battery can realize a high electromotive force of from 2 V to 4.5 V.

On the other hand, many of the organic solvents are flammable materials, and thus the safety of the secondary battery has been an issue as compared to the secondary battery using an aqueous solution. Although various measures are being taken to improve the safety of the secondary battery using the electrolyte of organic solvents, such measures are not necessarily sufficient. Further, since a dry environment is required for the nonaqueous secondary battery in the manufacturing process, the manufacturing cost necessarily increases. In addition, the organic solvent electrolyte has inferior Li conductivity to that of the aqueous electrolyte, and thus the internal resistance of the secondary battery is apt to increase. Solving such problems have been big issues in applications for an electric automobile and a hybrid electric automobile in which the battery safety and the battery cost are emphasized, and in an application for a large-sized storage battery for electricity storage.

For obtaining a high electromotive force of 2 V or greater, the nonaqueous electrolyte is indispensable. In order to achieve an inexpensive and safe secondary battery, substitution of the nonaqueous electrolyte to an aqueous electrolyte has been expected. However, when the aqueous electrolyte is used so as to obtain an electromotive force of 2 V or greater, self-discharge by electrolysis of the aqueous solvent is large and a problem such as corrosion of the current collector thus occurs, whereby the operation of the secondary battery is not stabilized, and there has been a problem in achieving a secondary battery that performs satisfactory charge and discharge.

BRIEF DESCRIPTION OF DRAWINGS

FIG. 1 is a sectional view schematically showing an example of an electrode according to the first embodiment;

FIG. 2 is a partially cutaway sectional view of a secondary battery according to a second embodiment;

FIG. 6 is a perspective view showing an example of a battery module according to a third embodiment;

FIG. 7 is a perspective view showing an example of a battery pack according to a fourth embodiment;

FIG. 9 is a block diagram showing an electric circuit of the battery pack of FIG. 8;

FIG. 10 is a sectional view schematically showing an example of a vehicle according to a fifth embodiment;

FIG. 11 is a view schematically showing another example of the vehicle according to the fifth embodiment;

DETAILED DESCRIPTION

Figure 3:
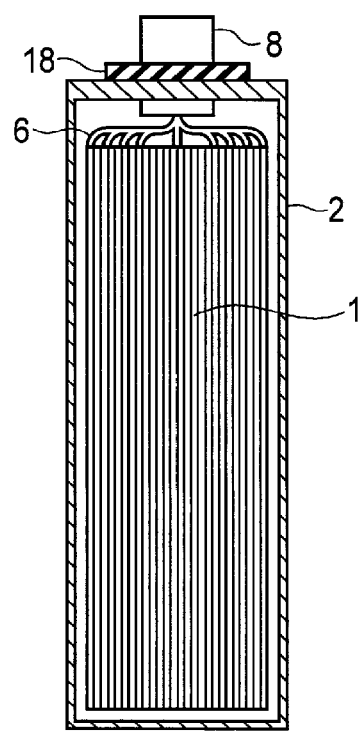
FIG. 3 is a side view of the battery of FIG. 2.

According to one embodiment, an electrode is provided. The electrode includes a current collector, an electrode mixture layer, and a first self-assembled film. The first self-assembled film covers at least a part of a surface of the current collector. The first self-assembled film contains organic molecules. The electrode mixture layer disposed on at least a part of the first self-assembled film.

Or the electrode includes a current collector, an electrode mixture layer, and a monomolecular film. The monomolecular film covers at least a part of a surface of the current collector. The monomolecular film contains organic molecules. The electrode mixture layer disposed on at least a part of a surface of the monomolecular film.

Or the electrode includes a current collector, an electrode mixture layer, and an organic molecular film. The organic molecular film covers at least a part of a surface of the current collector. The electrode mixture layer disposed on at least a part of a surface of the monomolecular film. The organic molecular film includes a structure represented by $R-XO_n$, the R being a first carbon chain structure or a second carbon chain structure having a functional group at a terminal thereof, the X being at least one selected from the group consisting of Si, P, N, and C, and the n being 0, 1, 2, or 3.

According to another embodiment, a secondary battery is provided. The secondary battery includes a positive electrode, a negative electrode, and an aqueous solution. At least one of the positive electrode and the negative electrode is the electrode according to any one of the embodiments.

According to another embodiment, a battery pack is provided. The battery pack includes the secondary battery according to the embodiment.

According to another embodiment, a vehicle is provided. The vehicle includes the battery pack according to the embodiment.

According to another embodiment, a stationary power supply is provided. The stationary power supply includes the battery pack according to the embodiment.

Hereinafter, embodiments will be described with reference to the drawings. Note that the same reference numerals are given to common configurations throughout the embodiments, and redundant descriptions are omitted. In addition, each drawing is a schematic view for describing the embodiment and facilitating the understanding thereof, and there are some differences in shape, dimension, ratio, and the like from an actual device. These, however, may be changed as appropriate, considering the following description and known technology.

First Embodiment

In order to solve the issues of nonaqueous secondary batteries, conversion of the electrolyte to an aqueous solution has been considered. In an aqueous solution electrolyte, a potential range of performing charging and discharging of the battery is required to be limited within a potential range where an electrolysis reaction of water, included as a solvent, does not occur. For example, when a lithium manganese oxide is used as a positive electrode active material and a lithium vanadium oxide is used as a negative electrode active material, electrolysis of the aqueous solvent can be avoided. According to this combination, however, though an electromotive force of about 1 V to 1.5 V can be obtained, it is difficult to obtain an energy density sufficient for a battery.

When a lithium manganese oxide is used as the positive electrode active material and a lithium titanium oxide such as $LiTi_2O_4$ or $Li_4Ti_5O_{12}$ is used as the negative electrode active material, an electromotive force of about 2.6 V to 2.7 V can be theoretically obtained, and thus the battery can be expected to be attractive in terms of the energy density. In a nonaqueous lithium ion battery employing such a combination of the positive and negative electrode materials, excellent life performance can be obtained, and such a battery has already been put into practical use. In an aqueous solution electrolyte, however, since a potential of lithium insertion and extraction for the lithium titanium oxide is about 1.5 V (vs. $Li/Li^+$) relative to a lithium reference potential, electrolysis of the aqueous solution electrolyte is apt to occur. In particular, at the negative electrode, hydrogen is vigorously generated by electrolysis occurring on a surface of a negative electrode current collector or a metal outer can electrically connected to the negative electrode, and thus the active material may become easily flaked off from the current collector due to the influence of the hydrogen generation. As a result, such a battery does not function stably and sufficient charge and discharge are difficult.

An electrode according to the first embodiment includes a current collector, an electrode mixture layer and a self-assembled film. The electrode mixture is disposed on at least a part of a surface of the current collector. The self-assembled film contains organic molecules and covers at least a part of the surface of the current collector.

The electrode of the present embodiment can be used as a positive electrode and a negative electrode. Therefore, the current collector means a positive electrode current collector and a negative electrode current collector. The electrode mixture layer refers to a positive electrode mixture layer and a negative electrode mixture layer. The electrode active material means a positive electrode active material and a negative electrode active material. The current collector and the active material that can be used for the positive electrode and the negative electrode will be described later.

The electrode according to a first embodiment includes a current collector and an electrode mixture layer (an electrode active material layer) including an electrode active material and a self-assembled film. At least a part of the surface of the current collector is covered with the self-assembled film (coating layer) containing organic molecules. The coating layer may cover the whole surface of the current collector. The coating layer may cover a part not covered with the electrode mixture layer in the current collector. The coating layer preferably covers the whole surface of the current collector. The coating layer is preferably provided further in a tab portion of the current collector. Furthermore, the coating layer may be provided on the surface of the current collector. The electrode mixture layer disposed on at least a part of the surface of the coating layer. The electrode mixture layer may faces the current collector via at least a part of the self-assembled film. A part of the electrode mixture layer may be provided on the current collector, while the other part may be provided on the self-assembled film.

The coating layer may be provided on the surface of the electrode mixture layer and the current collector. The organic molecule desirably has a structure represented by R—$XO_n$ (Formula 1). In (Formula 1), R is a structure having a carbon chain or a structure having a functional group at a terminal of a carbon chain, X is at least one selected from the group consisting of Si, P, N, and C, and n is 0, 1, 2, or 3.

Also, the R may be a first carbon chain structure or a second carbon chain structure having a functional group at a terminal thereof.

The organic molecule may have a main chain of carbon and a reactive functional group. Examples of the reactive functional group include phosphonic acid, carboxylic acid, isocyanide, isocyanate, and sulfur. The organic molecule may have a carbon framework as a side chain. Specific examples of the organic molecule include decyltrichlorosilane ($C_{10}H_{21}SiCl_3$), octadecyltrimethoxysilane ($C_{18}H_{37}SiO_3$ ($CH_3$)$_3$), propyltrimethoxysilane ($C_3H_7SiO_3$ ($CH_3$)$_3$), decylphosphonic acid ($C_{10}H_{21}PO(OH)_2$), hexylphosphonic acid ($C_6H_{13}PO(OH)_2$) octadecylphosphonic acid ($C_{18}H_{37}PO(OH)_2$), hexylisocyanide ($C_6H_{13}NC$), decylisocyanate ($C_{12}H_{25}NCO$), hexylisocyanate ($C_6H_{13}NCO$), stearic acid ($C_{17}H_{35}COOH$), and the like. These organic molecules can form a self-assembled film on the substrate. The thickness of the coating layer can be set to a desired thickness by adjusting the carbon chain length of these organic molecules.

Also, it is preferable that the organic molecule contains fluorine in the carbon chain R. This is because the inclusion of fluorine improves the hydrophobicity of the self-assembled film, so that it is possible to prevent water and the active material from coming into contact with each other, which causes hydrogen generation at the electrode. R is a carbon chain and may contain a reactive functional group at the terminal. The reactive functional group contains, for example, at least one element of Si, P, N and C.

The organic molecules may include a structure represented by formula (1) A-$R_1$—B. The A represents one selected from the group consisting of a carboxyl group, a fluoroalkyl group, a phosphonic acid group, silanolic hydroxy groups, and an amino group. The $R_1$ is represented by $C_aH_b$, a is 3 or larger and 17 or smaller, b is 1 or larger and 35 or smaller. The B is one selected from the group consisting of a carboxyl group, a phosphonic acid group, silanolic hydroxy groups.

The organic molecule may be at least one selected from the group consisting of 1H, 1H, 2H, 2H-perfluoro-n-hexylphosphonic acid, 10-carboxydecylphosphonic acid, stearic acid, N-(2-aminoethyl)-3-aminopropyltriethoxysilane, Octadecylphosphonic acid, and the like are preferable.

This coating layer is formed on the surface of the current collector by causing chemical reaction between the electrode and the organic molecule in a self-assembled manner. Here, what is the self-assembled manner will be described. The self-assembled manner means that when the reaction portion of the organic molecule reacts with the reaction site of the substrate, the organic molecules chemically bond to the substrate due to electrostatic repulsion without being bonded to each other. As a result, in principle, subsequent binding of the organic molecules to the substrate is stopped at a stage where all reaction portions of organic molecules are bonded to the reaction site of the substrate. Hence a coating layer of a self-assembled monomolecular film (self-assembled film) in which only one layer of organic molecules is bonded to the substrate is formed. In addition, since there is electrostatic repulsion between the organic molecules, it is possible to form a uniform film having a pattern such as a stripe structure.

When this reaction occurs at the electrode, the organic molecule chemically bonds to the current collector as a self-assembled film using the current collector as a substrate to form a coating layer. Forming this coating layer on the current collector prevents water molecules from coming into contact with the electrode surface. Thus, when the electrode according to the first embodiment is used for the negative electrode, the water reduction decomposition at the negative electrode can be reduced, and when the electrode according to the first embodiment is used for the positive electrode, corrosion of the current collector at the positive electrode can be prevented. Further, in either case of the positive electrode or the negative electrode, with the coating layer being a monomolecular film and thus sufficiently thin, these effects can be realized without impairing the Li conductivity and electron conductivity of the electrode. Although the monomolecular film is preferred, the self-assembled film is not limited to the monomolecular film, but can be a multilayer film. Even when the multilayer film is used, the multilayer film can function similarly to the monomolecular film. The multilayer film can be formed by having a reactive functional group at the terminal of the carbon chain in R in the above (Formula 1).

Also, with respect to the electrode mixture layer, the organic molecules can be chemically bonded in the same manner as above, and hence the coating layer of the self-assembled film can be formed on the electrode mixture layer as well as the current collector.

Note that the electrode mixture layer may contain a carbon material such as acetylene black or graphite or a metal material such as Zn or Al as a conductive agent, and a resin such as PVdF or PTFE as a binder. The coating layer can also be formed on the surfaces of the conductive agent and the binder. By causing the coating layer to be present on the surface of the electrode mixture layer or the current collector, it is possible to prevent electrolysis of the aqueous solvent which is generated at the time of coming into contact with an aqueous solvent contained in the electrolyte, and elution of the conductive agent or metals used in the current collector, namely corrosion.

The coating layer can be formed, for example, by immersing an electrode or a substrate in a solution, in which organic molecules that form a self-assembled film are dissolved, followed by heating and drying. The coating layer can also be formed by placing the solution, the electrode or the substrate in a sealed container, followed by heating. In addition, the coating layer may be formed by applying the solution to the electrode or the substrate to obtain an application layer, followed by heating and drying the application layer. In the heating and drying, performing the heating and drying at, for example, 100° C. or higher can cause the coating layer to react well with the electrode and the substrate. However, performing the drying at a high temperature of, for example, 200° C. or higher is not preferred because a material included in the electrode, for example, the binder or the organic molecules themselves, is decomposed.

In a case where a layered body of a current collector and an electrode mixture layer is used as the electrode, the electrode mixture layer is immersed in a solution in which the organic molecules are dissolved. Therefore, the self-assembled film is formed on a part of the current collector where no electrode mixture layer is contacted and on a surface of the electrode mixture layer. Furthermore, the self-assembled film may also be provided on a surface of a tab portion of the current collector, a side surface of the current collector, a side surface of the electrode mixture layer, and in voids in the electrode mixture layer.

In a case where a current collector is used as the substrate, the self-assembled film is formed on at least a part of, for example, on the entire surface of the current collector. By applying slurry containing the materials of the electrode mixture layer to the principal surface of the current collector, on which the self-assembled film is provided, and drying the slurry, it is possible to obtain an electrode in which the current collector, the self-assembled film, and the electrode mixture layer are layered in this order. Further, the self-assembled film may also be provided on a surface of the tab.

As the solution in which the organic molecules are dissolved, a solvent which has high solubility of the organic molecules and prevents condensation reaction of the organic molecules is preferred. Depending on the type of organic molecule, aromatic hydrocarbons such as toluene, xylene and mesitylene, cycloalkanes such as cyclohexane, cycloheptane, cyclooctane, and cyclononane, alkanes such as hexane, heptane, octane, nonane, and decane, alkyl alcohols such as methanol, ethanol, 1-propanol, and 2-propanol, water, and the like can be used alone or in combination.

For example, in a case where the electrode according to the present embodiment is used as the negative electrode, since the coating layer of the self-assembled film is present on the surface of the negative electrode, in the electrode surface on which the potential is low, it is possible to prevent the aqueous solvent from coming into direct contact with the negative electrode and reduce the reductive decomposition reaction of the aqueous solvent. Also, at the negative electrode that is low in terms of potential, in a case where pH of the electrolyte is a strong acid or a strong alkali, metal elution is a concern when a metal material is used as the current collector or the conductive agent. However, forming the coating layer on the surface of the negative electrode prevents solvation of the eluted metal ions and diffusion of the metal ions from the vicinity of the electrode surface, thereby kinetically preventing corrosion.

Further, for example, when the electrode according to the present embodiment is used for the positive electrode, water electrolysis and corrosion can be prevented similarly to the case described as the negative electrode. Particularly, in the positive electrode that may become a high potential, there is a concern about the effect of corrosion, so corrosion preventive effect by the coating layer is great.

Therefore, the secondary battery used as the negative electrode or the positive electrode of the electrode according to the present embodiment can prevent the self-discharge, improve the charge/discharge efficiency, and improve the life. The self-discharge, the charge/discharge efficiency, and the life are the battery characteristic.

In a case where the electrode according to the present embodiment is used for both the positive electrode and the negative electrode, since the battery characteristics improved by the positive electrode and negative electrode including the coating layer can be multiplied, when the coating layer is formed on both the positive and negative electrodes, the battery characteristics can be synergistically improved and the battery characteristics can be further improved.

The thickness of the coating layer is preferably 0.4 nm or greater and 5 nm or smaller even when the coating layer is formed on the current collector or formed on the electrode mixture layer. By the presence of the coating layer with the thickness in this range, side reactions such as water electrolysis and electrode corrosion can be prevented without impairing Li conductivity and electron conductivity of the electrode. The thickness of the coating layer is more preferably 0.7 nm or greater and 2.5 nm or smaller. When the thickness of the coating layer is in this range, it is effective for compatibility between battery characteristics and prevention of side reactions. The same thing can be said for the range of the thickness of the coating layer, whether the coating layer is a monomolecular film or a multilayer film.

The thickness of the coating layer can be measured by, for example, an ellipsometer (J. A. Woollam Co., Inc., Typ M44). A xenon arc lamp having a wavelength of 400 to 800 nm is used as a light source, and the spectrum is measured as an average of three points on the sample surface with an incident angle of 75°, and the film thickness can be calculated. In the case of measuring the thickness of the coating layer formed at the interface between the current collector and the electrode mixture layer in the electrode, the mixture layer is dissolved with ethanol or the like to expose the surface of the current collector, and then the thickness of the coating layer on the current collector can be measured.

When the coating layer is smaller than 0.4 nm, electrolysis of water and corrosion of metal material cannot be sufficiently prevented by bringing the water molecules of the aqueous solvent and the electrode surface close to each other. On the other hand, when the thickness is larger than 5 nm, the Li conductivity and the electron conductivity of the electrode remarkably deteriorate, thereby causing large deterioration in battery characteristics. More preferably, the thickness of the coating layer is 0.5 nm or greater and 2 nm or smaller on the surface of the electrode mixture layer and 1.0 nm or greater and 4.0 nm or smaller on the surface of the current collector. Within this range, it is possible to maintain the Li conductivity of the electrode while preventing water electrolysis and corrosion. Since it is not necessary to consider Li conduction in the thickness of the coating layer provided on the current collector, the thickness of the coating layer can be made large as compared to that of the coating layer provided on the electrode mixture layer.

Further, it can be observed by atomic force microscope (AFM) observation that the coating layer is a self-assembled film. An area of 500 nm×500 nm on the surface of the sample is measured in a tapping mode with an atomic force microscope (e.g., Digital Instruments model: NanoScope III) by using a silicon chip [NCH-50] for a cantilever, and from the obtained phase image, a minute change in the thickness of the sample surface can be measured. As a result, it can be confirmed that the carbon chains are regularly arranged to form a pattern such as a stripe structure.

Here, a method for measuring organic molecules will be described.

The organic molecule can be confirmed using detection by X-ray photoelectron spectroscopy (xPS), for example. For example, first, a lithium secondary battery, having undergone initial charge, is discharged, and thereafter, this battery is disassembled to take out an electrode. The electrode having been taken out is washed with pure water for 30 minutes, and then vacuum-dried for 24 hours in an environment at a temperature of 80° C. After drying, the temperature is returned to 25° C., XPS measurement is carried out using, for example, a complex type electron spectroscopic analyzer (ESCA-5800 manufactured by ULVAC-PHI, INCORPORATED) with a measuring area φ of 800 μm, a sputtering rate of 2.9 nm/min, and AlKα radiation as a radiation source, and it is possible to confirm a reactive functional group of the organic molecule present on the surface of the extracted electrode. When the measurement on the surface of the current collector is to be performed, the electrode mixture layer is dissolved with ethanol or the like in advance to expose the surface of the current collector, and then the measurement can be performed.

In a case where a coating layer is provided by immersing a layered body of the current collector and the electrode mixture layer into a solution in which organic molecules are dissolved, the surface of the current collector may include both a portion with the coating layer and a portion with no coating layer. This is because a coating layer is not easily formed on a portion of the surface of the collector that is in contact with the electrode mixture layer. In order to measure the thickness of the coating layer existing in the measurement region, the ellipsometer measures the thickness of the coating layer existing in the measurement region, including a portion with no coating layer. Thus, during the measurement with the ellipsometer, a region including both a portion with the coating layer and a portion with no coating layer is defined as the measurement region. Therefore, the coating layer on the current collector may be measured to be thinner than the coating layer on the principle surface of the electrode mixture layer.

The electrode according to the present embodiment is an electrode provided with a current collector and an electrode mixture layer disposed on the surface of the current collector, and in the electrode, at least a part of the surface of the current collector has a self-assembled film of organic molecules. It is thus possible to prevent side reactions such as water electrolysis of the electrolyte and corrosion of the electrode, and it is possible to prevent the self-discharge, improve the charge/discharge efficiency, and improve the life.

FIG. 1 is a sectional view schematically showing an example of an electrode according to the first embodiment. An electrode 500 shown in FIG. 1 includes a current collector 501 and an electrode mixture layer 502 disposed on the current collector 501. The current collector 501 includes a portion not covered with the electrode mixture layer 502, that is, a tab 501a. The electrode mixture layer 502 includes a plurality of active material particles 502a. The electrode mixture layer 502 is porous.

The electrode 500 shown in FIG. 1 is obtained by immersing the layered body of the current collector and the electrode mixture layer into a solution in which organic molecules are dissolved, and then drying the immersed body. On the principal surface of the current collector 501, the portion, with which the active material particles 502a are not in contact, is covered with a first self-assembled film 503c. The principal surface of each electrode mixture layer 502 is covered with a second self-assembled film 503b. Both principal surfaces of the tab 501a of the current collector are covered with a third self-assembled film 503a. The first to third self-assembled films contain the same organic molecules. Note that first to third self-assembled films may contain organic molecules different from one another.

At least a part of the side surfaces of the current collector and the tab 501a of the current collector may be covered with a self-assembled film. At least a part of the side surface of the electrode mixture layer 502 may also be covered with a self-assembled film. Furthermore, the surfaces of the active material particles 502a in the electrode mixture layer 502 may be covered with a self-assembled film.

The first to third self-assembled film may be formed by the same organic molecules. The first to third self-assembled film may be formed by organic molecules different from one another. The first to third self-assembled film may be called a self-assembled film.

Second Embodiment

A secondary battery according to a second embodiment includes a positive electrode, a negative electrode, and an aqueous electrolyte, and at least one of the positive electrode and the negative electrode is the electrode according to the first embodiment. Materials for the respective members usable in the secondary battery according to the second embodiment will be described in detail.

1) Negative Electrode

The negative electrode includes a negative electrode current collector and a negative electrode mixture layer disposed on the negative electrode current collector. The negative electrode mixture layer is disposed on at least one surface of the negative electrode current collector. For example, the negative electrode mixture layer may be disposed on one surface on the negative electrode current collector, or the negative electrode mixture layer may be disposed on one surface on the negative electrode current collector and the rear surface thereof.

The negative electrode mixture layer includes a negative electrode active material including at least one compound selected from the group consisting of an oxide of titanium, a lithium titanium oxide, and a lithium titanium composite oxide. The oxides may be used alone or as a mixture of several oxides. In the oxides, Li insertion and extraction reaction occurs within a range of 1 V to 2 V (vs. Li/Li$^+$) relative to a lithium reference potential. For that reason, when the oxides described above are used as the negative electrode active material of the lithium secondary battery, the change in volume due to expansion and contraction, which accompany charge and discharge, is small, and thus long operation life can be realized.

It is preferable that at least one element A selected from the group consisting of Zn, Ga, In, Bi, Tl, Sn, Pb, Ti and Al, is included in the current collector. The element A may be used alone or as a mixture of multiple elements, and may be included in the state of a metal or metal alloy. The metal and metal alloy may be included alone or as a mixture of two or more. When the element A is included in the current collector, the mechanical strength of the current collector is increased and thus the processing thereof is improved. Further, the effect of suppressing the electrolysis of the aqueous solvent to thereby suppress the hydrogen generation is increased. As the element A described above, Zn, Pb, Ti and Al are more preferable.

The current collector is, for example, a metal foil made of these metals. Further, the current collector is, for example, a foil made of an alloy containing these metals. Such a foil may contain, for example, one or more elements described below, in addition to the element A. Besides the foil, examples of the shape of the metal article or alloy article as the current collector include a mesh and a porous structure. For improving the energy density and output, the shape of the foil having a small volume and a large surface area is desired.

Further, the negative electrode current collector may include a substrate containing a metal different from the element A. In such a case, the hydrogen generation can be suppressed by the presence of the compound containing the element A on at least a part of the surface of the substrate. The compound containing the element A present on the surface is desirably disposed so as to be in contact with the negative electrode mixture layer. For example, the element A can be made present on the surface of the substrate by plating the element A on the substrate. Alternatively, it is possible to perform plating treatment using an alloy containing element A on the surface of the substrate.

The current collector may include at least one compound selected from the group consisting of an oxide of element A, a hydroxide of element A, a basic carbonate compound of element A, and a sulfate compound of element A. The oxide of element A and/or the hydroxide of element A and/or the basic carbonate compound of element A, and/or the sulfate compound of element A are preferably included in at least a part of the surface region of the current collector, within a depth region of from 5 nm or greater to 1 μm or less in the depth direction from the current collector surface. An example of the oxide of element A includes ZnO, an example of the hydroxide of element A includes Zn(OH)$_2$, an example of the basic carbonate compound of element A includes 2ZnCO$_3$.3Zn(OH)$_2$, and an example of the sulfate compound of element A includes ZnSO$_4$.7H$_2$O, and the like.

When at least one of an oxide of the element A, a hydroxide of the element A, a basic carbonate compound of the element A, and a sulfate compound of the element A is present in the surface layer portion of the current collector, hydrogen generation can be suppressed. In addition, when these compounds are present in the surface layer portion of the current collector, the adhesion between the current collector and the active material is improved, enabling an increase in paths for electronic conduction. Therefore, it is possible to improve the cycle performance and reduce the electrical resistance.

The substrate preferably includes at least one metal selected from the group consisting of Al, Fe, Cu, Ni, and Ti. The metals may be included in the state of an alloy. The substrate may include the metal or metal alloy alone or as a mixture of two or more. The substrate preferably includes Al, Ti, or an alloy thereof, from the perspective of weight reduction.

Whether or not at least one compound selected from the group consisting of the oxide of element A, the hydroxide of element A, the basic carbonate compound of element A, and the sulfate compound of element A is contained in the current collector, can be examined by disassembling the battery as described above and then conducting, for example, inductively coupled plasma (ICP) emission spectrometry.

The negative electrode active material includes one compound, or two or more compounds selected from the group consisting of an oxide of titanium, lithium titanium oxide, and lithium titanium composite oxide. Examples of the lithium titanium composite oxide include a niobium titanium oxide and a sodium niobium titanium oxide. The compounds desirably have a Li insertion potential in a range of 1 V (vs. Li/Li$^+$) to 3 V (vs. Li/Li$^+$).

Examples of the oxide of titanium include an oxide of titanium having a monoclinic structure, an oxide of titanium having a rutile structure, and an oxide of titanium having an anatase structure. For the oxide of titanium having each crystal structure, the composition before charging can be represented by $TiO_2$, and the composition after charging can be represented by $Li_xTiO_2$, wherein x is $0 \leq x \leq 1$. The structure before charging for the oxide of titanium having the monoclinic structure can be represented by $TiO_2(B)$. The titanium oxide is also called titanium oxide.

Examples of the lithium titanium oxide include a lithium titanium oxide having a spinel structure (for example, the general formula: $Li_{4+x}Ti_5O_{12}$ wherein x is $-1 \leq x \leq 3$), a lithium titanium oxide having a ramsdellite structure (for example, $Li_{2+x}Ti_3O_7$ wherein $-1 \leq x \leq 3$), $Li_{1+x}Ti_2O_4$ wherein $0 \leq x \leq 1$, $Li_{1.1+x}Ti_{1.8}O_4$ wherein $0 \leq x \leq 1$, $Li_{1.07+x}Ti_{1.86}O_4$ wherein $0 \leq x \leq 1$, and $Li_xTiO_2$ wherein $0 < x$), and the like.

Examples of the niobium titanium oxide include oxides represented by $Li_aTiM_bNb_{2\pm\beta}O_{7\pm\sigma}$ wherein $0 \leq a \leq 5$, $0 \leq b \leq 0.3$, $0 \leq \beta \leq 0.3$, $0 \leq \sigma \leq 0.3$, and M includes at least one selected from the group consisting of Fe, V, Mo, and Ta. The niobium titanium oxide is also called a niobium-titanium composite oxide.

Examples of the sodium niobium titanium oxide include an orthorhombic Na-containing niobium titanium composite oxide represented by the general formula $Li_{2+v}Na_{2-w}M1_xTi_{6-y-z}Nb_yM2_zO_{14+\delta}$ wherein $0 \leq v \leq 4$, $0 < w < 2$, $0 \leq x < 2$, $0 < y < 6$, $0 \leq z < 3$, $y+z < 6$, $-0.5 \leq \delta \leq 0.5$, M1 includes at least one selected from the group consisting of Cs, K, Sr, Ba, and Ca, and M2 includes at least one selected from the group consisting of Zr, Sn, V, Ta, Mo, W, Fe, Co, Mn, and Al.

Preferable compounds for the negative electrode active material may include the oxide of titanium having an anatase structure, the oxide of titanium having a monoclinic structure, and the lithium titanium oxide having the spinel structure. Each compound has a Li insertion potential of from 1.4 V (vs. Li/Li$^+$) to 2 V (vs. Li/Li$^+$), and thus, when combined with a lithium manganese oxide as the positive electrode active material, for example, a high electromotive force can be obtained. Especially, the lithium titanium oxide having the spinel structure is more preferable because the change in volume due to the charge-discharge reaction is very small.

The negative electrode active material may be included in the negative electrode mixture layer in the form of particles. The negative electrode active material particle may be singular primary particles, secondary particles in which each of the secondary particles include aggregated primary particles, or a mixture of singular primary particles and secondary particles. The shape of the particles is not particularly limited and, for example, may be a spherical shape, an elliptic shape, a flat shape, a fiber shape, or the like.

It is preferable that an average particle size (a diameter) of the secondary particles of the negative electrode active material is 3 μm or more, more preferably from 5 μm to 20 μm. When the size is within this range, the surface area of the active material is small, and thus the effect of suppressing the hydrogen generation can be increased.

The negative electrode active material having the secondary particles whose average particle size is 3 μm or more can be obtained, for example, by the following method. First, starting materials for the active material are subjected to synthetic reaction to produce an active material precursor having an average particle size of 1 μm or less. After that, the active material precursor is subjected to a firing treatment, followed by a pulverization treatment using a pulverizer such as a ball mill or a jet mill. Next, by a firing treatment, the active material precursors are aggregated and grown into secondary particles having a large particle size.

The primary particles in the negative electrode active material desirably have an average particle size of 1 μm or less. This way, a diffusion length of Li ions within the active material is shortened, and a specific surface area becomes larger. Therefore, high input performance (rapid charging performance) can be obtained. On the other hand, when the average particle size is small, the particles become easily aggregated, whereby the distribution of the electrolyte becomes inclined toward the negative electrode, and the electrolyte may consequently be exhausted at the positive electrode. For that reason, the lower limit of the average primary particle size is desirably 0.001 μm. The average particle size is more preferably from 0.1 μm to 0.8 μm.

The negative electrode active material particles desirably have a specific surface area of from 3 m$^2$/g to 200 m$^2$/g, as determined by a BET method employing N$_2$ deposition. By having such a specific surface area, the affinity between the negative electrode and the electrolyte can be further enhanced.

The negative electrode mixture layer (excluding the current collector) desirably has a specific surface area of from 3 m$^2$/g to 50 m$^2$/g. The specific surface area is more preferably from 5 m$^2$/g to 50 m$^2$/g. The negative electrode mixture layer may be a porous layer including the negative electrode active material, the electro-conductive agent, and the binder, where the layer is supported on the current collector.

The porosity of the negative electrode (excluding the current collector) is desirably in a range of 20% to 50%, whereby a negative electrode having excellent affinity between the negative electrode and the electrolyte and high density can be obtained. The porosity is more preferably in a range of 25% to 40%.

The electro-conductive agent may include carbon materials such as acetylene black, carbon black, coke, carbon fiber, and graphite, and powders of a metal such as nickel or zinc. The electro-conductive agent may be used alone or as a mixture of two or more agents. It is desirable to use the metal powder as the electro-conductive agent, because hydrogen is generated from the carbon material itself.

The binder may include, for example, polytetrafluoroethylene (PTFE), polyvinylidene fluoride (PVdF), fluororubber, ethylene-butadiene rubber, polypropylene (PP), polyethylene (PE), carboxymethyl cellulose (CMC), polyimide (PI), polyacrylimide (PAI), and the like. The binder may be used alone or as a mixture of two or more binders.

With respect to the mixing ratio of the negative electrode active material, the electro-conductive agent, and the binder in the negative electrode mixture layer, it is preferable that the negative electrode active material is included in a range of 70% by weight to 95% by weight, the electro-conductive agent is included in a range of 3% by weight to 20% by weight, and the binder is included in a range of 2% by weight to 10% by weight. When the mixing ratio of the electro-conductive agent is 3% by weight or more, the electro-conductivity of the negative electrode can be made good, and when the mixing ratio is 20% by weight or less, the degradation of the electrolyte on the surface of the electro-conductive agent can be reduced. When the mixing ratio of the binder is 2% by weight or more, sufficient electrode strength can be obtained, and when the mixing ratio is 10% by weight or less, the insulating portions within the electrode can be reduced.

The negative electrode can be produced, for example, by the following method. First, the negative electrode active material, the electro-conductive agent, and the binder are dispersed in an appropriate solvent to prepare a slurry. The resulting slurry is coated onto the current collector, and the coat of applied slurry is dried to form the negative electrode mixture layer on the current collector. Here, for example, the slurry may be coated on one side of the current collector, or may be coated on one surface of the current collector and a surface on the reverse side. Then, the current collector and the negative electrode mixture layer are subjected to pressing, for example, heat pressing, whereby the negative electrode can be produced.

2) Positive Electrode

The positive electrode may include a positive electrode current collector, and a positive electrode mixture layer supported on one surface or both of reverse surfaces of the positive electrode current collector, where the positive electrode active material layer includes an active material, an electro-conductive agent, and a binder.

It is preferable to use a foil, porous structure, or mesh made of a metal such as stainless steel, Al, or Ti as the positive electrode current collector. In order to prevent corrosion of the current collector caused by the reaction of the current collector with the electrolyte, the surface of the current collector may be covered with another element.

As the positive electrode active material, there may be used a material capable of having lithium and sodium be inserted and extracted. The positive electrode may include one kind of positive electrode active material, or include two or more kinds of positive electrode active materials. Examples of the positive electrode active material include a lithium manganese composite oxide, a lithium nickel composite oxide, a lithium cobalt aluminum composite oxide, a lithium nickel cobalt manganese composite oxide, a spinel type lithium manganese nickel composite oxide, a lithium manganese cobalt composite oxide, a lithium iron oxide, a lithium fluorinated iron sulfate, a phosphate compound having an olivine crystal structure (for example, $Li_xFePO_4$ wherein $0 \leq x \leq 1$, or $Li_xMnPO_4$ wherein $0 \leq x \leq 1$), and the like. The phosphate compound having an olivine crystal structure has excellent thermal stability.

Examples of the positive electrode active material with which a high positive electrode potential can be obtained are described below. Examples include lithium manganese composite oxides such as $Li_xMn_2O_4$ having a spinel structure wherein $0<x \leq 1$, or $Li_xMnO_2$ wherein $0<x \leq 1$; a lithium nickel aluminum composite oxide such as $Li_xNi_{1-y}Al_yO_2$ wherein $0<x \leq 1$ and $0<y<1$; lithium cobalt composite oxides such as $Li_xCoO_2$ wherein $0 \leq x \leq 1$; lithium nickel cobalt composite oxides such as $Li_xNi_{1-y-z}Co_yMn_zO_2$ wherein $0<x \leq 1$, $0<y \leq 1$, and $0 \leq z \leq 1$; lithium manganese cobalt composite oxides such as $Li_xMn_yCo_{1-y}O_2$ wherein $0<x \leq 1$ and $0<y \leq 1$; spinel type lithium manganese nickel composite oxides such as $Li_xMn_{2-y}Ni_yO_4$ wherein $0<x \leq 1$ and $0<y<2$; lithium phosphates having an olivine structure such as $Li_xFePO_4$ wherein $0<x \leq 1$, $Li_xFe_{1-y}Mn_yPO_4$ wherein $0<x \leq 1$ and $0 \leq y \leq 1$, or $Li_xCoPO_4$ wherein $0<x \leq 1$; fluorinated iron sulfates such as $Li_xFeSO_4F$ wherein $0<x \leq 1$, and the like.

Further examples of the positive electrode active material include sodium manganese composite oxide, sodium nickel composite oxide, sodium cobalt composite oxide, sodium nickel cobalt manganese composite oxide, sodium iron composite oxide, sodium phosphate compounds (for example, sodium iron phosphate and sodium vanadium phosphate), sodium iron manganese composite oxide, sodium nickel titanium composite oxide, sodium nickel iron composite oxide, and sodium nickel manganese composite oxide.

Examples of a preferable positive electrode active material include iron composite oxides (for example, $Na_yFeO_2$, wherein $0 \leq y \leq 1$), iron manganese composite oxides (for example, $Na_yFe_{1-x}Mn_xO_2$, wherein $0<x<1$, $0 \leq y \leq 1$), nickel titanium composite oxide (for example, $Na_yNi_{1-x}Ti_xO_2$, wherein $0<x<1$, $0 \leq y \leq 1$), a nickel iron composite oxide (for example, $Na_yNi_{1-x}Fe_xO_2$, wherein $0<x<1$, $0 \leq y \leq 1$), nickel-manganese composite oxide (for example, $Na_yNi_{1-x}Mn_xO_2$, wherein $0<x<1$, $0 \leq y \leq 1$), nickel manganese iron composite oxide (for example, $Na_yNi_{1-x-z}Mn_xFe_zO_2$, wherein $0<x<1$, $0 \leq y \leq 1$, $0<z<1$, $0<1-x-z<1$), iron phosphate (for example, $Na_yFePO_4$, wherein $0 \leq y \leq 1$).

The particle of the positive electrode active material may be singular primary particles, secondary particles in which each of the secondary particles include aggregated primary particles, and a mixture of both the singular primary particles and the secondary particles. The primary particles of the positive electrode active material preferably have an average particle size (a diameter) of 10 μm or less, more preferably from 0.1 μm to 5 μm. The secondary particles of the positive electrode active material preferably have an average particle size (a diameter) of 100 μm or less, more preferably from 10 μm to 50 μm.

It is preferable that at least a part of the particle surface of the positive electrode active material is covered with a carbon material. The carbon material may be in the form of a layered structure, a particulate structure, or a form of aggregated particles.

As the electro-conductive agent for increasing the electron conductivity of the positive electrode mixture layer and suppressing the contact resistance between the positive electrode layer and the current collector, examples include acetylene black, carbon black, graphite, carbon fiber having an average fiber diameter of 1 μm or less, and the like. The electro-conductive agent may be used alone or as a mixture of two or more agents.

The binder for binding the active material to the electro-conductive agent include, for example, polytetrafluoroethylene (PTFE), polyvinylidene fluoride (PVdF), fluororubber, ethylene-butadiene rubber, styrene-butadiene rubber (SBR), polypropylene (PP), polyethylene (PE), carboxymethyl cellulose (CMC), polyimide (PI), and polyacrylimide (PAI). The binder may be used alone or as a mixture of two or more binders.

With respect to the mixing ratio of the positive electrode active material, the electro-conductive agent, and the binder in the positive electrode mixture layer, it is preferable that the positive electrode active material is included in a range of 70% by weight to 95% by weight, the electro-conductive agent is included in a range of 3% by weight to 20% by weight, and the binder is included in a range of 2% by weight to 10% by weight. When the mixing ratio of the electro-conductive agent is 3% by weight or more, the electro-conductivity of the positive electrode can be made good, and when the mixing ratio is 20% by weight or less, the degradation of the electrolyte on the surface of the electro-conductive agent can be reduced. When the mixing ratio of the binder is 2% by weight or more, sufficient electrode strength can be obtained, and when the mixing ratio is 10% by weight or less, the insulating portions within the electrode can be reduced.

The positive electrode can be produced, for example, by the following method. First, the positive electrode active material, the electro-conductive agent, and the binder are dispersed in an appropriate solvent to prepare a slurry. The resulting slurry is coated onto the current collector, and the coat of applied slurry is dried to form the positive electrode mixture layer on the current collector. Here, for example, the slurry may be coated on one side of the current collector, or may be coated on one surface of the current collector and a surface on the reverse side. Then, the current collector and the positive electrode mixture layer are subjected to pressing, for example, heat pressing, whereby the positive electrode can be produced.

3) Electrolyte

Examples of the electrolyte include an electrolytic solution containing an aqueous solvent and a first electrolyte, and a gel electrolyte obtained by combining a polymer material in this electrolytic solution. The electrolyte is also called an aqueous electrolyte. The polymer material includes, for example, polyvinylidene fluoride (PVdF), polyacrylonitrile (PAN), polyethylene oxide (PEO), and the like. The electrolytic solution will be described here. The electrolyte contains at least one anion selected from the group consisting of $NO_3^-$, $LiSO_4^-$, $SO_4^{2-}$, and $OH^-$. The electrolyte may contain one of these anions, or alternatively, two or more anions may be included. In order to distinguish an electrolyte as used for generically naming the electrolytic solution and the gel electrolyte, from an electrolyte as a solute, the electrolyte as the solute is referred to as a first electrolyte for the sake of convenience.

As an aqueous solvent, a solution including water may be used. Here, the solution including water may be pure water, or alternatively, a mixed solution or a mixed solvent of water and materials other than water.

In the above-described electrolyte, the amount of water solvent (for example, amount of water in the aqueous solvent) is preferably 1 mol or more, based on 1 mol of salt as solute. The amount of water solvent is more preferably 3.5 mol or more, based on 1 mol of salt as solute.

As the first electrolyte, there may be used a substance that becomes dissociated and thus generates the anion described above when the substance is dissolved in the aqueous solvent. In particular, preferable are lithium salts that dissociate into Li ion(s) and the anion described above. Such lithium salts include, for example, $LiNO_3$, $LiCl$, $Li_2SO_4$, $LiOH$, and the like.

The lithium salt that dissociates into Li ion(s) and the above anion has a relatively high solubility in aqueous solvents. For that reason, there can be obtained an electrolyte, in which the anion concentration is of a high concentration of from 1 M to 10 M, and thus having favorable Li ion diffusibility.

The electrolyte containing $NO_3^-$ and/or $Cl^-$ may be used in a wide anion concentration range of about 0.1 M to 10 M. From the perspective of fulfilling both ion conductivity and lithium equilibrium potential, the anion concentration is preferably of a high concentration of from 3 M to 12 M. It is more preferable that the anion concentration of the electrolyte containing $NO_3^-$ or $Cl^-$ is from 8 M to 12 M.

The electrolyte containing $LiSO_4^-$ and/or $SO_4^{2-}$ may be used in an anion concentration range of about 0.05 M to 2.5 M. From the perspective of ion conductivity, the anion concentration is preferably of a high concentration of from 1.5 M to 2.5 M.

The $OH^-$ concentration in the electrolyte is desirably from $10^{-10}$ M to 0.1 M.

The electrolyte may contain both lithium ions and sodium ions.

The solute in the electrolyte, i.e., the first electrolyte can be determined qualitatively and quantitatively, for example, by ion chromatography. Ion chromatography is particularly preferable as the analysis method because of high sensitivity.

Examples of specific measurement conditions for the qualitative and quantitative analysis of the solute included in the electrolyte according to ion chromatography are shown below:

System: Prominence HIC-SP
Analysis Column: Shim-pack IC-SA3
Guard Column: Shim-pack IC-SA3 (G)
Eluent: 3.6 mmol/L, aqueous sodium carbonate solution
Flow Rate: 0.8 mL/minute
Column Temperature: 45° C.
Injection Amount: 50 µL
Detection: electric conductivity Whether or not water is included in the electrolyte can be examined by gas chromatography-mass spectrometry (GC-MS) measurement. Water content in the electrolyte can be calculated, for example, from emission spectrometry using ICP, or the like. In addition, the mole numbers of the solvent can be calculated from the measurement of specific weight of the electrolyte. The same electrolyte may be used on the positive electrode side and the negative electrode side, or different electrolytes may be used. In this case, the pH of the electrolyte of the positive electrode is preferably from 1 to 7. When the pH of the electrolyte of the positive electrode is 8 or more, the oxygen generation reaction resulting from electrolysis of water progresses advantageously, which is not preferable. When the pH is 1 or less, degradation of the active material proceeds, which is not preferable. The pH of the electrolyte of the negative electrode is preferably from 7 to 14. When the pH of the electrolyte is 7 or less, the hydrogen generation reaction due to the electrolysis of water advantageously advances, which is not preferable.

In addition, the electrolyte may contain the organic molecules described in the first embodiment.

4) Separator

A separator may be disposed between the positive electrode and the negative electrode. When the separator is made from an insulating material, it is possible to prevent electrical contact between the positive electrode and the negative electrode. In addition, it is desirable to use a separator having a shape that allows the electrolyte to be capable of migrating between the positive electrode and the negative electrode. Examples of the separator include a non-woven, a film, a paper sheet, and the like. Examples of the material forming the separator may include polyolefin such as polyethylene and polypropylene, and cellulose. Preferable examples of the separator include a non-woven including cellulose fiber and a porous film including a polyolefin fiber. The separator preferably has a porosity of 60% or more. The fiber diameter is preferably 10 µm or less. When the fiber diameter is 10 µm or less, the affinity of the separator with the electrolyte is improved, thus resulting in decreased battery resistance. The more preferable range of the fiber diameter is 3 µm or less. The cellulose fiber-including non-woven having a porosity of 60% or more can be well impregnated with the electrolyte, and can exhibit a high output performance at a low temperature to a high temperature. In addition, even during storage for a long time in a charged state, during float charging, or when exposed to overcharge, the separator does not react with the negative electrode, and short-circuiting between the negative electrode and the positive electrode caused by precipitation of dendrites of the lithium metal does not occur. The more preferable range is from 62% to 80%.

A solid electrolyte may also be used as the separator. As the separator, oxides such as LATP ($Li_{1+x}Al_xTi_{2-x}(PO_4)_3$, wherein $0.1 \leq x \leq 0.4$) having a NASICON framework, LIPON (e.g., $Li_{2.9}PO_{3.3}N_{0.46}$) in an amorphous state, and LLZ (e.g., $Li_7La_3Zr_2O_{12}$) having a garnet structure are preferable.

The examples of solid electrolyte also include β alumina, $Na_{1+x}Zr_2Si_xP_{3-x}O_{12}$ ($0 \leq x \leq 3$), and $NaAlSi_3O_8$.

The separator preferably has a thickness of from 20 μm to 100 μm, and a density of from 0.2 g/cm³ to 0.9 g/cm³. Within these ranges, the mechanical strength and the reduction of battery resistance can be well-balanced, and a secondary battery having a high output and having suppressed internal short-circuiting can be provided. In addition, there is little thermal contraction of the separator under a high temperature environment, and the capability for the battery to be stored under high temperature becomes good.

5) Container Member

A container made of metal, a container made of laminate film, a container made of resin, such as polyethylene or polypropylene, may be used for a container member in which the positive electrode, the negative electrode, and the electrolyte are housed.

As the container made of metal, a metal can made of nickel, iron, stainless steel, or zinc and having an angular or cylindrical shape may be used.

The container made of resin and the container made of metal desirably have a wall thickness within a range of 1 mm or less, and more preferably 0.5 mm or less. An even more preferable range is 0.3 mm or less. The lower limit of the wall thickness is desirably 0.05 mm.

The laminate film includes, for example, a multilayer film in which a metal layer is covered with resin layers, and the like. Examples of the metal layer include a stainless steel foil, an aluminum foil, and an aluminum alloy foil. A polymer such as polypropylene (PP), polyethylene (PE), nylon, and polyethylene terephthalate (PET) may be used for the resin layer. The laminate film preferably has a thickness of 0.5 mm or less, more preferably 0.2 mm or less. The lower limit of the thickness of the laminate film is desirably 0.01 mm.

The secondary battery according to the embodiment may be applied to secondary batteries of various forms such as an angular shaped form, cylindrical shaped form, a flat-type, a thin-type, or a coin-type. The secondary battery preferably has a bipolar structure, whereby there is an advantage in that a cell having plural electrode units connected in series can be produced with a single cell.

An example of a secondary battery according to the embodiment is explained with reference to FIG. 2 to FIG. 5.

One example of a secondary battery using a container made of metal is shown in FIG. 2 and FIG. 3.

The electrode group 1 is housed in a rectangular-tube-shaped metal container 2. The electrode group 1 has a structure in which the positive electrode 3, the negative electrode 4, and the separator 5 disposed therebetween are spirally wound in a manner such that a flat shape is obtained. An electrolyte (not shown) is held in the electrode group 1. As shown in FIG. 3, a belt-shaped positive electrode lead 6 is electrically connected to each of plural positions on the edge of the positive electrode 3 located on the end surface of the electrode group 1. A belt-shaped negative electrode lead 7 is electrically connected to each of plural positions on the edge of the negative electrode 4 located on the end surface. The plural positive electrode leads 6 are bundled into one, and electrically connected to a positive electrode electro-conduction tab 8. A positive electrode terminal is composed from the positive electrode leads 6 and the positive electrode electro-conduction tab 8. The negative electrode leads 7 are bundled into one, and connected to a negative electrode electro-conduction tab 9. A negative electrode terminal is composed from the negative electrode leads 7 and the negative electrode electro-conduction tab 9.

A metal sealing plate 10 is fixed over an opening of the metal container 2 by welding or the like. The positive electrode electro-conduction tab 8 and the negative electrode electro-conduction tab 9 are respectively drawn out to the outside through outlets provided on the sealing plate 10. The inner circumferential surface of each outlet of the sealing plate 10 is covered with an insulating member, in order to avoid short-circuiting due to contact of the sealing plate 10 with the positive electrode electro-conduction tab 8 and the negative electrode electro-conduction tab 9.

A positive electrode gasket 18 and a negative electrode gasket 19 are respectively disposed on the inner periphery surface of each drawing hole of the sealing plate 10 in order to avoid short circuits developed by the contact between the positive electrode electro-conduction tab 8 and sealing plate 10, and by the contact between the negative electrode electro-conduction tab 9 and sealing plate 10. The airtightness of the rectangular secondary battery can be ensured by disposing the positive electrode gasket 18 and the negative electrode gasket 19.

A control valve 22 (safety valve) is disposed in the sealing plate 10. In the case where the internal pressure of a battery cell is increased due to gas generated by electrolysis of an aqueous solvent, it is possible to diffuse the generated gas from the control valve 22 to the outside. The control valve 22 to be used is, for example, a return control valve which operates when the internal pressure becomes higher than a set value and which functions as a sealing plug when the internal pressure decreases. Alternatively, a non-return valve may be used, where once it is operated, its function as the sealing plug is not recovered. In FIG. 1, the control valve 22 is disposed in the center of the sealing plate 10, and the control valve 22 may be located at the end of the sealing plate 10. The control valve 22 may be omitted.

An injection port 23 is formed in the sealing plate 10. An electrolyte is poured through the injection port 23. The injection port 23 is closed by a sealing plug 24 after pouring the electrolyte. The injection port 23 and the sealing plug 24 may be omitted.

Figure 4:
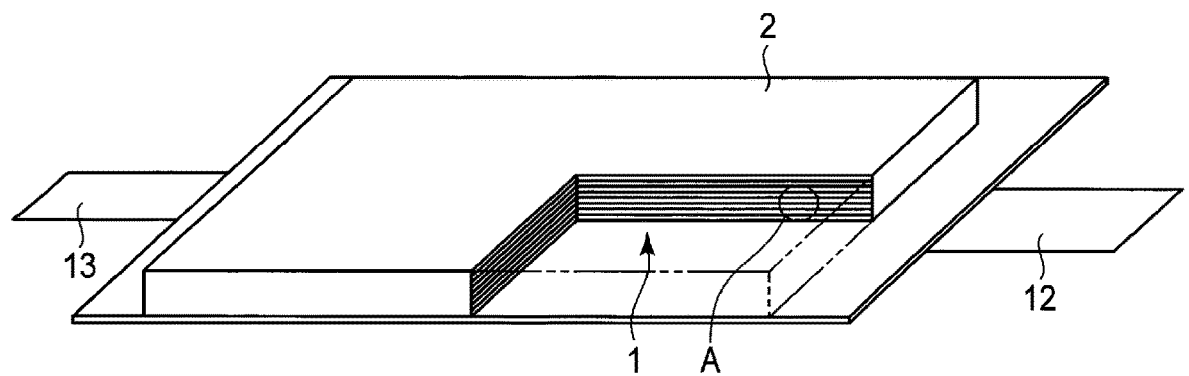
FIG. 4 is a partially cutaway perspective view showing a secondary battery according to a second embodiment.
Figure 5:
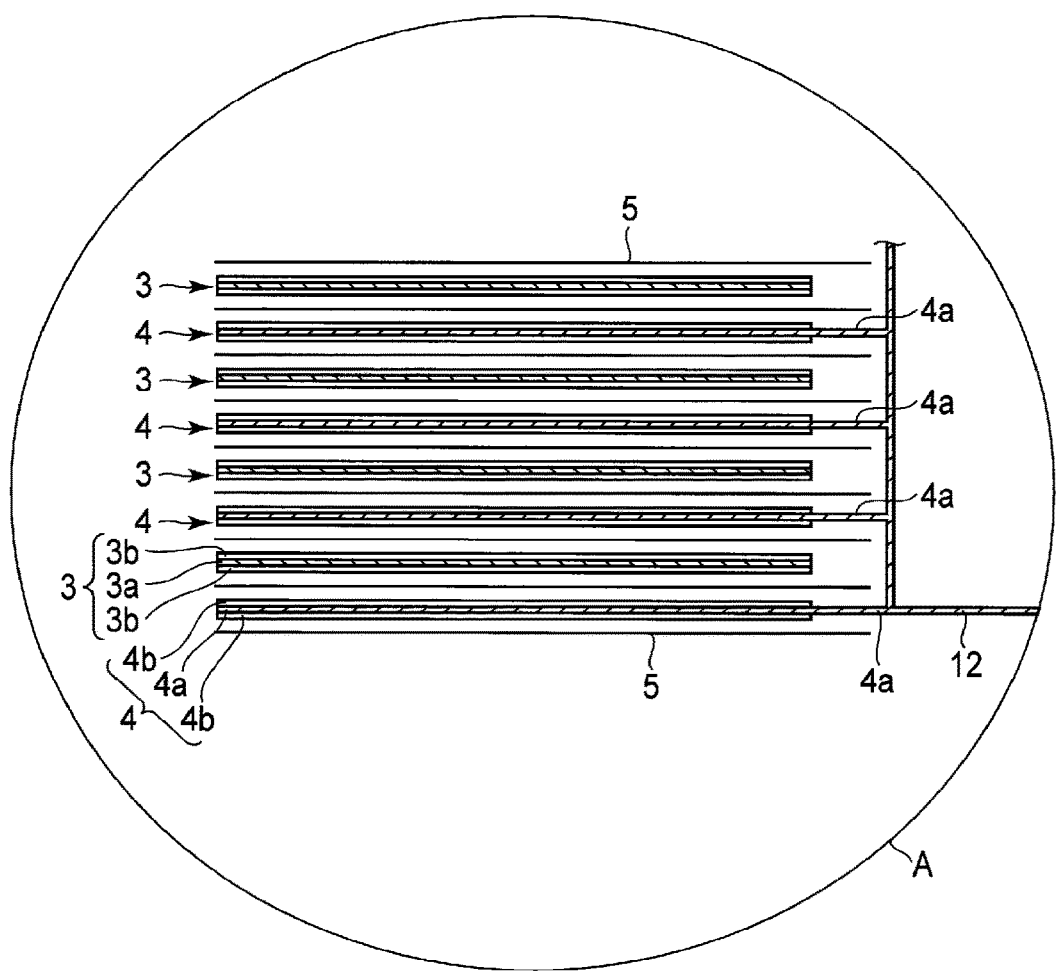
FIG. 5 is an enlarged sectional view of a portion A of FIG. 4.

One example of a secondary battery using a container member made of the laminate film is shown in FIG. 4 and FIG. 5.

A stacked electrode group 1 is housed in a bag-form container 2. The bag-form container 2 is made of a laminate film where a metal layer is sandwiched between two resin films. As shown in FIG. 5, the stacked electrode group 1 has a structure in which positive electrodes 3 and negative electrodes 4 are alternately stacked with a separator 5 sandwiched therebetween. The electrode group 1 includes plural positive electrodes 3. Each of the plural positive electrodes 3 includes a current collector 3a, and positive electrode active material-containing layers 3b formed on both of reverse surfaces of the positive electrode current collector 3a. The electrode group 1 includes plural negative electrodes 4. Each of the plural negative electrodes 4 includes a current collector 4a, and negative electrode active material-containing layers 4b formed on both of reverse surfaces of the current collector 4a. An end of the current collector 4a of each of the negative electrodes 4 protrudes out from the positive electrodes 3. The protruded current collector 4a is electrically connected to a belt-shaped negative electrode terminal 12. The distal end of the belt-shaped negative electrode terminal 12 is extended out from the container 2. Although not shown in the drawings, an end of the current collector 3a of the positive electrode 3 protrudes from the negative electrodes 4 at the side opposed to the protruded end of the current collector 4a. The current collectors 3a protruding from the negative electrodes 4 are electrically connected to a belt-shaped positive electrode terminal 13. The distal end of the belt-shaped positive electrode terminal 13 is positioned on the opposite side from the negative electrode terminal 12, and extends out from a side of the container 2.

In the secondary batteries shown in FIG. 2 to FIG. 5, there may be provided a safety valve for releasing hydrogen gas that has generated within the container to the outside. As the safety valve, either one of a return type valve, which operates when an internal pressure becomes higher than a pre-determined value and functions as a sealing plug when the internal pressure is reduced, and a non-return type valve, which does not recover its function as the sealing plug once it is operated, can be used. Although the secondary batteries shown in FIG. 2 to FIG. 5 are sealed batteries, an open type battery is possible, in the case that a circulation system for converting hydrogen gas into water is included.

According to the above-described embodiment, since the secondary battery can be provided with the electrode according to the first embodiment, it is possible to prevent side reactions such as water electrolysis of the electrolyte and corrosion of the electrode, and it is possible to prevent the self-discharge, improve the charge/discharge efficiency, and improve the life.

Third Embodiment

According to a third embodiment, it is possible to provide a battery module using a secondary battery as a unit cell. For the secondary battery, the secondary battery of the second embodiment can be used.

Examples of the battery module include a battery module including plural unit cells as structural units where has unit cells are electrically connected in series or in parallel in each structural unit, a battery module including a unit structured by plural unit cells that are electrically connected in series or a unit structured by plural unit cells that are electrically connected in parallel, and the like.

The battery module may be housed in a housing. As the housing, a metal can formed of aluminum alloy, iron, stainless steel, or the like, a plastic container, or the like may be used. The container desirably has a wall thickness of 0.5 mm or more.

Examples of the aspect in which the plural secondary batteries are electrically connected in series or in parallel include an aspect in which the plural secondary batteries each has a container and are electrically connected in series or in parallel, and an aspect in which plural electrode groups are housed in the same housing and are electrically connected in series or in parallel. Specific examples of the former are those in which positive electrode terminals and negative electrode terminals of plural secondary batteries are connected via metal bus bars (for example, aluminum, nickel, or copper). Specific examples of the latter include an aspect in which plural electrode groups are housed in one housing in a state of being electrochemically insulated from each other by partitions, and these electrode groups are electrically connected to each other in series. When the number of batteries that are electrically connected in series is in a range of 5 to 7, voltage compatibility with a lead storage battery becomes good. In order to further increase the voltage compatibility with the lead storage battery, a structure in which 5 or 6 unit cells are connected in series is preferable.

One example of the battery module is explained with reference to FIG. 6. A battery module 31, shown in FIG. 6, includes plural square-type secondary batteries $32_1$ to $32_5$ according to the second embodiment (for example, FIG. 2 or FIG. 3) as unit cells. A positive electrode electro-conduction tab 8 of battery $32_1$ and a negative electrode electro-conduction tab 9 of battery $32_2$ positioned adjacent thereto, are electrically connected by a lead 33. Further, a positive electrode electro-conduction tab 8 of the battery $32_2$ and a negative electrode electro-conduction tab 9 of battery $32_3$ positioned adjacent thereto, are electrically connected through a lead 33. In this manner, the batteries $32_1$ to $32_5$ are connected in series.

According to the battery module of the third embodiment, since the secondary battery according to the second embodiment is included, it is possible to provide a battery module capable of preventing self-discharge, improving charge/discharge efficiency, and life.

Fourth Embodiment

According to a fourth embodiment, a battery pack is provided. The battery pack includes the secondary battery according to the second embodiment.

The battery pack according to the fourth embodiment may include one or more secondary batteries (unit cells) according to the second embodiment described above. The plural secondary batteries, which may be included in the battery pack according to the fourth embodiment, may be electrically connected to each other in series, in parallel or in a combination of in series and in parallel. The plural secondary batteries may be electrically connected to compose a battery module. In the case of composing a battery module from plural secondary batteries, the battery module according to the third embodiment may be used.

The battery pack according to the fourth embodiment may further include a protective circuit. The protective circuit has a function of controlling the charge and discharge of the secondary battery (or secondary batteries). Alternatively, a circuit included in equipment that uses the battery pack as a power source (for example, an electronic device, a vehicle such as an automobile, or the like) may be used as the protective circuit of the battery pack.

Moreover, the battery pack according to the fourth embodiment may further include an external power distribution terminal. The external power distribution terminal is configured to externally output current from the secondary battery and/or to input current into a unit cell. In other words, when the battery pack is used as a power source, the current is externally provided through the external power distribution terminal. When the battery pack is charged, the charge current (including a regenerative energy of a power of a vehicle such as an automobile, or the like) is provided to the battery pack through the external power distribution terminal.

An example of the battery pack according to the fourth embodiment is explained with reference to FIG. 7. FIG. 7 is a schematic perspective view showing one example of the battery packs.

A battery pack 40 includes a battery module including the secondary battery shown in FIGS. 3 and 6. The battery pack 40 includes a housing 41, and a battery module 42 housed in the housing 41. In the battery module 42, plural (for example, five) secondary batteries $43_1$ to $43_5$ are electrically connected in series. The secondary batteries $43_1$ to $43_5$ are stacked in a thickness direction. The housing 41 has an opening 44 on each of an upper portion and four side surfaces. The side surfaces, from which the positive and negative electrode terminals 12 and 13 of the secondary batteries $43_1$ to $43_5$ protrude, are exposed through the opening 44 of the housing 41. A positive electrode terminal 45 for output of the battery module 42 is belt-shaped, and one end thereof is electrically connected to any or all of the positive electrode terminals 13 of the secondary batteries $43_1$ to $43_5$, and the other end protrudes beyond the opening 44 of the housing 41 and thus protrudes past the upper portion of the housing 41. On the other hand, a negative electrode terminal 46 for output of the battery module 42 is belt-shaped, and one end thereof is electrically connected to any or all of the negative electrode terminals 12 of the secondary batteries $43_1$ to $43_5$, and the other end protrudes beyond the opening 44 of the housing 41 and thus protrudes past the upper portion of the housing 41.

Figure 8:
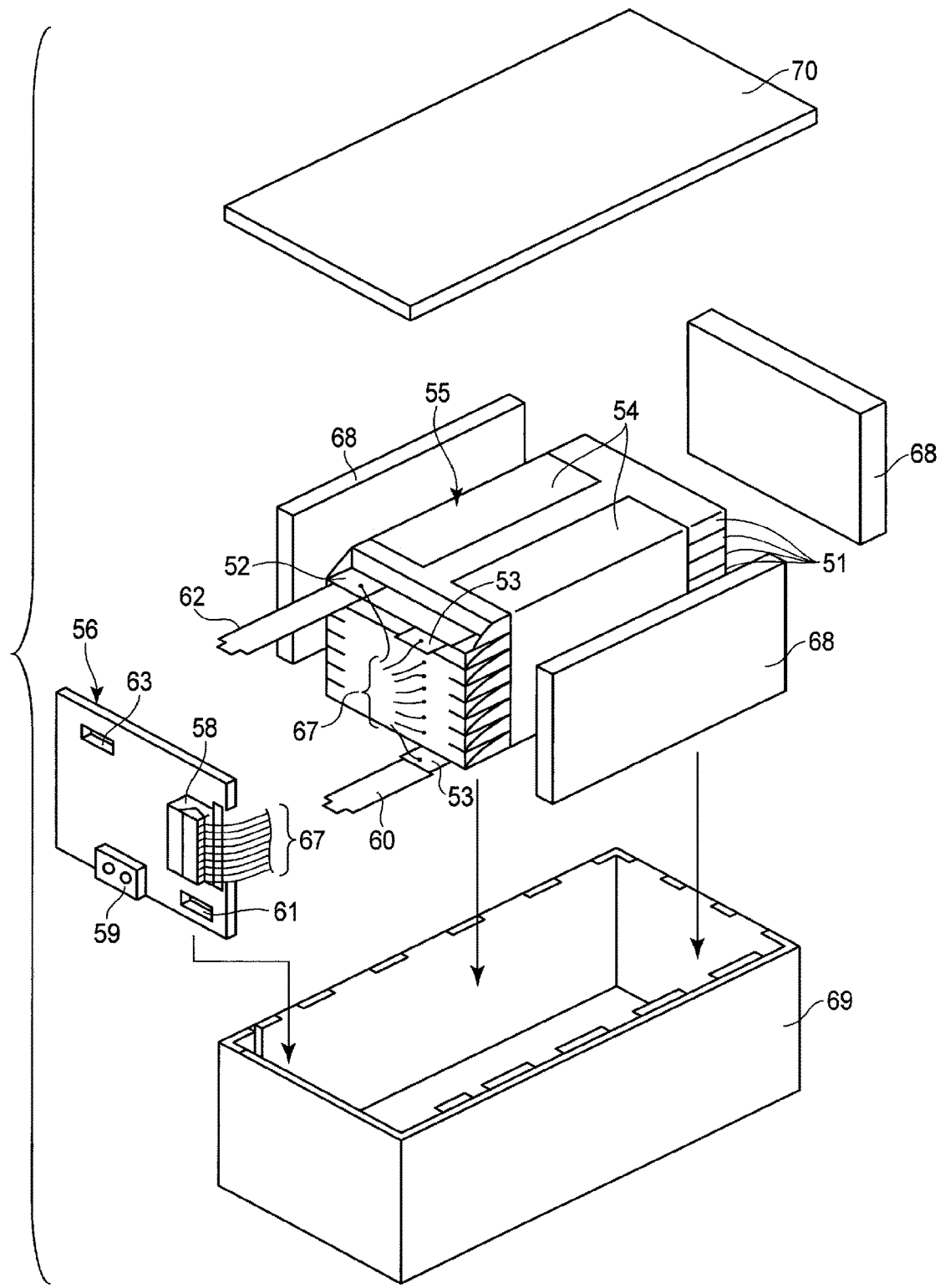
FIG. 8 is an exploded perspective view of an example of a battery pack according to a fourth embodiment.

Another example of the battery pack according to the fourth embodiment is explained in detail with reference to FIG. 8 and FIG. 9. FIG. 8 is an exploded perspective view showing another example of the battery pack according to the fourth embodiment. FIG. 9 is a block diagram showing an electric circuit of the battery pack in FIG. 8.

Plural unit cells 51, i.e. flat-type secondary batteries, are stacked such that externally extending negative electrode terminals 52 and positive electrode terminals 53 are arranged in the same direction, and the resulting stack is fastened with an adhesive tape 54 to form a battery module 55. The unit cells 51 are electrically connected to each other in series, as shown in FIG. 9.

A printed wiring board 56 is disposed facing the side surfaces of the unit cells 51 from which the negative electrode terminals 52 and the positive electrode terminals 53 extend out. A thermistor 57, a protective circuit 58, and an external power distribution terminal 59 are mounted on the printed wiring board 56, as shown in FIG. 9. An electrically insulating plate (not shown) is attached to the surface of the printed wiring board 56 facing the battery module 55 to avoid unnecessary connection with wirings of the battery module 55.

A positive electrode lead 60 is connected to a positive electrode terminal 53 located lowermost in the battery module 55, and the distal end of the lead 60 is inserted into a positive electrode-side connector 61 on the printed wiring board 56 and thus electrically connected to the connector. A negative electrode lead 62 is connected to a negative electrode terminal 52 located uppermost in the battery module 55, and the distal end of the lead 62 is inserted into a negative electrode-side connector 63 on the printed wiring board 56 and thus electrically connected to the connector. The connectors 61 and 63 are connected to the protective circuit 58 through wirings 64 and 65 formed on the printed wiring board 56.

The thermistor 57 detects the temperature of the unit cells 51, and the detection signals are sent to the protective circuit 58. The protective circuit 58 can shut off a plus wiring (positive electrode-side wiring) 66a and a minus wiring (negative electrode-side wiring) 66b between the protective circuit 58 and the external power distribution terminal 59 under predetermined conditions. An example of the predetermined condition is the case where the temperature detected by the thermistor 57 becomes a predetermined temperature or higher. Another example of the predetermined condition is the case when the over-charge, over-discharge or over-current of the unit cells 51 is detected. The detection of the over-charge, or the like, is performed for each individual unit cell 51 or for the battery module 55. When each individual unit cell 51 is detected, the battery voltage may be detected, or the positive electrode potential or negative electrode potential may be detected. In the latter case, a lithium electrode, which is used as a reference electrode, is inserted into each individual unit cell 51. In the case of FIG. 8 and FIG. 9, a wiring 67 for voltage detection is connected to each of the unit cells 51, and the detected signals are sent to the protective circuit 58 through the wirings 67.

Protective sheets 68, made of rubber or resin, are arranged on three side planes of the battery module 55 except for the side plane where the positive electrode terminals 53 and the negative electrode terminals 52 protrude out.

The battery module 55 is housed in a housing container 69 together with the protective sheets 68 and the printed wiring board 56. That is, the protective sheets 68 are arranged on both internal surfaces along a long side direction and one internal surface along a short side direction of the housing container 69, and the printed wiring board 56 is disposed on the opposite internal surface along the short side direction. The battery module 55 is located in a space surrounded by the protective sheets 68 and the printed wiring board 56. A lid 70 is attached to the upper surface of the housing container 69.

In order to fix the battery module 55, a heat-shrinkable tape may be used instead of the adhesive tape 54. In such a case, the battery module is fastened by placing the protective sheets on both side surfaces of the battery module, revolving the heat-shrinkable tape around the battery module, and thermally shrinking the heat-shrinkable tape.

In FIGS. 7 and 8, an aspect has been shown in which the unit cells 51 are connected in series, however, in order to increase the battery capacity, the cells may be connected in parallel. Alternatively, the connection in series and the connection in parallel may be combined. Furthermore, assembled battery packs may be connected to each other in series and/or in parallel.

The aspect of the battery pack may be appropriately changed depending on the application thereof. The battery pack can be suitably used in applications in which cycle performance is demanded to be excellent when large current is taken out. Specifically the battery pack may be used, for example, as a power source of a digital camera, as a battery for installing in a vehicle such as a two-wheeled or four-wheeled hybrid electric automobile, a two-wheeled or four-wheeled electric automobile, a power-assisted bicycle, or a railway car, or as a stationary battery. In particular, the battery pack is suitably used onboard a vehicle.

In a vehicle onto which the battery pack according to the fourth embodiment has been installed, the battery pack is configured, for example, to recover regenerative energy from motive force of the vehicle.

According to the battery pack of the fourth embodiment described above, since the secondary battery according to the second embodiment is included, it is possible to provide a battery pack capable of preventing self-discharge, improving charge/discharge efficiency, and life.

Fifth Embodiment

According to a fifth embodiment, a vehicle is provided. The vehicle includes the battery pack according to the fourth embodiment.

In the vehicle according to the fifth embodiment, the battery pack is configured, for example, to recover regenerative energy from motive force of the vehicle. The vehicle according to the fifth embodiment may include a mechanism for converting kinetic energy of the vehicle into regenerative energy.

Examples of the vehicle according to the fifth embodiment include two-wheeled to four-wheeled hybrid electric automobiles, two-wheeled to four-wheeled electric automobiles, power-assisted bicycles, and railway cars.

In the vehicle according to the fifth embodiment, the installing position of the battery pack is not particularly limited. For example, when installing the battery pack on the vehicle, the battery pack may be installed in the engine compartment of the vehicle, in rear parts of the vehicle, or under seats.

An example of the vehicle according to the fifth embodiment is explained below, with reference to the drawings.

FIG. 10 is a cross-sectional view schematically showing an example of a vehicle according to the fifth embodiment.

A vehicle 71, shown in FIG. 10 includes a vehicle body and a battery pack 72. The battery pack 72 may be the battery pack according to the fourth embodiment.

The vehicle 71, shown in FIG. 10, is a four-wheeled automobile. As the vehicle 71, for example, a two-wheeled to four-wheeled hybrid electric automobile, a two-wheeled to four-wheeled electric automobile, a power-assisted bicycle, or railway car may be used.

The vehicle 71 may include plural battery packs 72. In that case, the battery packs 72 may be connected to each other in series or in parallel. The connection may be a combination of the connection in series and the connection in parallel.

The battery pack 72 is installed in an engine compartment located at the front of the vehicle body. The position at which the battery pack 72 is installed is not particularly limited. The battery pack 72 may be installed in rear sections of the vehicle body, or under a seat. The battery pack 72 may be used as a power source of the vehicle 71. The battery pack 72 can also recover regenerative energy of motive force of the vehicle 71.

Next, with reference to FIG. 11, an aspect of operation of the vehicle according to the fifth embodiment is explained.

FIG. 11 is a view schematically showing another example of the vehicle according to the fifth embodiment. A vehicle 300, shown in FIG. 11, is an electric automobile.

The vehicle 300, shown in FIG. 11, includes a vehicle body 301, a vehicle power source 302, a vehicle ECU (electric control unit) 380, which is a master controller of the vehicle power source 302, an external terminal (an external power connection terminal) 370, an inverter 340, and a drive motor 345.

The vehicle 300 includes the vehicle power source 302, for example, in an engine compartment, in the rear sections of the automobile body, or under a seat. In FIG. 11, the position of the secondary battery installed in the vehicle 300 is schematically shown.

The vehicle power source 302 includes plural (for example, three) battery packs 312a, 312b and 312c, BMU (a battery management unit) 311, and a communication bus 310.

The three battery packs 312a, 312b and 312c are electrically connected in series. The battery pack 312a includes a battery module 314a and a battery module monitoring unit (VTM: voltage temperature monitoring) 313a. The battery pack 312b includes a battery module 314b, and a battery module monitoring unit 313b. The battery pack 312c includes a battery module 314c, and a battery module monitoring unit 313c. The battery packs 312a, 312b and 312c can each be independently removed, and may be exchanged by a different battery pack 312.

Each of the battery modules 314a to 314c includes plural single-batteries connected to each other in series. At least one of the plural single-batteries is the secondary battery according to the second embodiment. The battery modules 314a to 314c each perform charging and discharging through a positive electrode terminal 316 and a negative electrode terminal 317.

In order to collect information concerning security of the vehicle power source 302, the battery management unit 311 performs communication with the battery module monitoring units 313a to 313c and collects information such as voltages or temperatures of the single-batteries included in the battery modules 314a to 314c included in the vehicle power source 302.

The communication bus 310 is connected between the battery management unit 311 and the battery module monitoring units 313a to 313c. The communication bus 310 is configured so that multiple nodes (i.e., the battery management unit and one or more battery module monitoring units) share a set of communication lines. The communication bus 310 is, for example, a communication bus configured based on CAN (Control Area Network) standard.

The battery module monitoring units 313a to 313c measure a voltage and a temperature of each single-battery in the battery modules 314a to 314c based on commands communicated from the battery management unit 311. It is possible, however, to measure the temperatures only at several points per battery module, and the temperatures of all of the single-batteries need not be measured.

The power source for vehicle 302 may also have an electromagnetic contactor (for example, a switch unit 333 shown in FIG. 11) for switching connection between the positive electrode terminal 316 and the negative electrode terminal 317. The switch unit 333 includes a precharge switch (not shown), which is turned on when the battery modules 314a to 314c are charged, and a main switch (not shown), which is turned on when battery output is supplied to a load. The precharge switch and the main switch include a relay circuit (not shown), which is turned on or off based on a signal provided to a coil disposed near the switch elements.

The inverter 340 converts an inputted direct current voltage to a three-phase alternate current (AC) high voltage for driving a motor. Three phase output terminal(s) of the inverter 340 is (are) connected to each three-phase input terminal of the drive motor 345. The inverter 340 controls an output voltage based on control signals from the battery management unit 311 or the vehicle ECU 380, which controls the entire operation of the vehicle.

The drive motor 345 is rotated by electric power supplied from the inverter 340. The rotation is transferred to an axle and driving wheels W via a differential gear unit, for example.

The vehicle 300 also includes a regenerative brake mechanism (regenerator), though not shown. The regenerative brake mechanism rotates the drive motor 345 when the vehicle 300 is braked, and converts kinetic energy to regenerative energy, as electric energy. The regenerative energy, recovered in the regenerative brake mechanism, is inputted into the inverter 340 and converted to direct current. The direct current is inputted into the vehicle power source 302.

One terminal of a connecting line L1 is connected via a current detector (not shown) in the battery management unit 311 to the negative electrode terminal 317 of the vehicle power source 302. The other terminal of the connecting line L1 is connected to a negative electrode input terminal of the inverter 340.

One terminal of a connecting line L2 is connected through the switch unit 333 to the positive electrode terminal 316 of the vehicle power source 302. The other terminal of the connecting line L2 is connected to a positive electrode input terminal of the inverter 340.

The external terminal 370 is connected to the battery management unit 311. The external terminal 370 is able to connect, for example, to an external power source.

The vehicle ECU 380 cooperatively controls the battery management unit 311 together with other units in response to inputs operated by a driver or the like, thereby performing the management of the whole vehicle. Data concerning the security of the vehicle power source 302, such as a remaining capacity of the vehicle power source 302, are transferred between the battery management unit 311 and the vehicle ECU 380 via communication lines.

The vehicle according to the fifth embodiment includes the battery pack according to the fourth embodiment. That is, due to including the battery pack excellent in charge/discharge efficiency and life performance, the vehicle according to the fifth embodiment is excellent in high charge and discharge efficiency and life performance, and due to the battery pack having excellent self-discharge characteristics, a vehicle with high reliability can be provided.

Sixth Embodiment

According to a sixth embodiment, a stationary power supply is provided. This stationary power supply is equipped with the battery pack according to the fourth embodiment. Note that this stationary power supply may be equipped with the battery module according to the third embodiment or the secondary battery according to the second embodiment instead of the battery pack according to the fourth embodiment.

The stationary power supply according to the sixth embodiment is equipped with the battery pack according to the fourth embodiment. Therefore, the stationary power supply according to the sixth embodiment can realize a long life.

Figure 12:
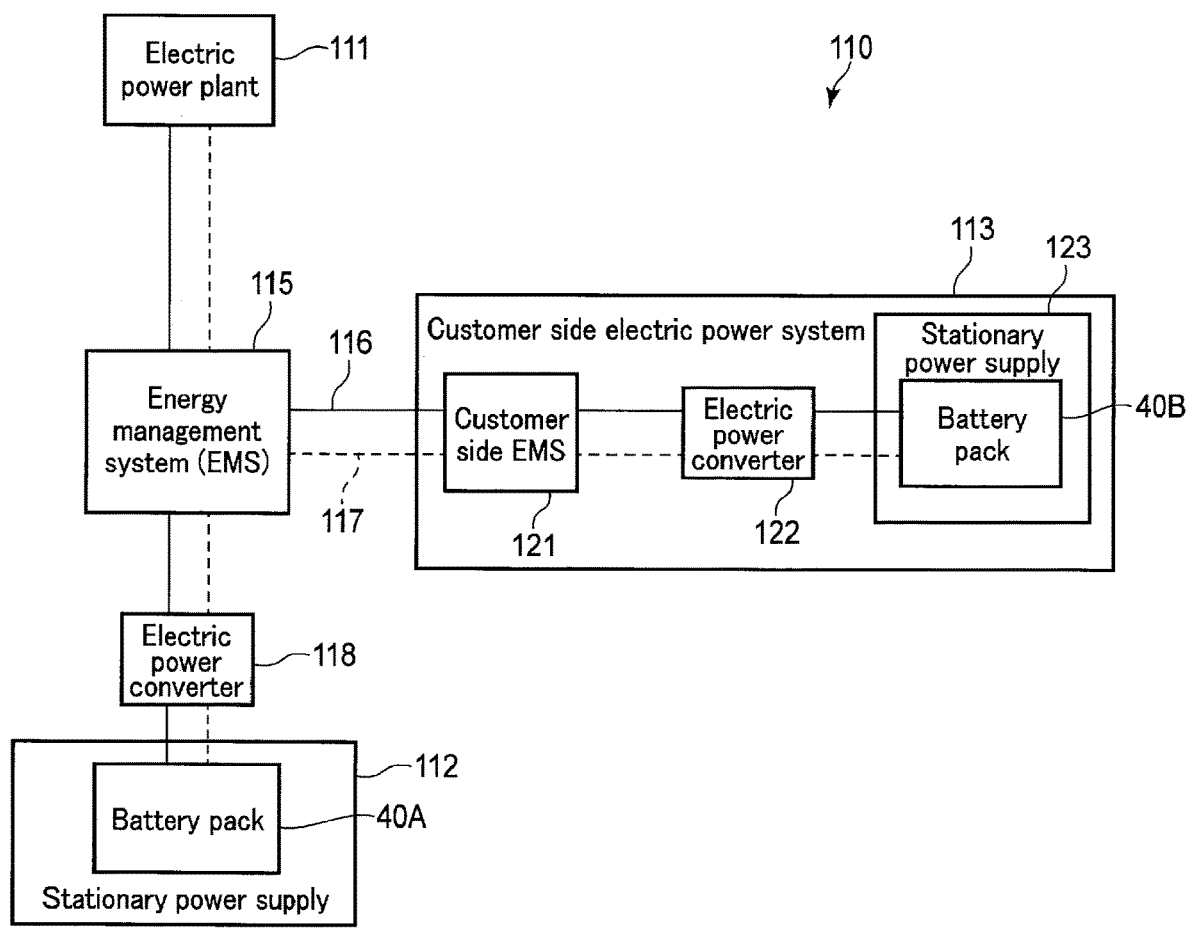
FIG. 12 is a block diagram showing an example of a system including a stationary power supply according to a sixth embodiment.

FIG. 12 is a block diagram showing an example of a system including a stationary power supply according to the sixth embodiment. FIG. 12 is a diagram showing an application example to stationary power supplies 112, 123 as an example of use of battery packs 40A, 40B according to the fourth embodiment. In the example shown in FIG. 12, a system 110 in which the stationary power supplies 112, 123 are used is shown. The system 110 includes an electric power plant 111, the stationary power supply 112, a customer side electric power system 113, and an energy management system (EMS) 115. Also, an electric power network 116 and a communication network 117 are formed in the system 110, and the electric power plant 111, the stationary power supply 112, the customer side electric power system 113 and the EMS 115 are connected via the electric power network 116 and the communication network 117. The EMS 115 performs control to stabilize the entire system 110 by utilizing the electric power network 116 and the communication network 117.

The electric power plant 111 generates a large amount of electric power from fuel sources such as thermal power or nuclear power. Electric power is supplied from the electric power plant 111 through the electric power network 116 and the like. In addition, the battery pack 40A is installed in the stationary power supply 112. The battery pack 40A can store electric power and the like supplied from the electric power plant 111. In addition, the stationary power supply 112 can supply the electric power stored in the battery pack 40A through the electric power network 116 and the like. The system 110 is provided with an electric power converter 118. The electric power converter 118 includes a converter, an inverter, a transformer and the like. Thus, the electric power converter 118 can perform conversion between direct current (DC) and alternate current (AC), conversion between alternate currents of frequencies different from each other, voltage transformation (step-up and step-down) and the like. Therefore, the electric power converter 118 can convert electric power from the electric power plant 111 into electric power that can be stored in the battery pack 40A.

The customer side electric power system 113 includes an electric power system for factories, an electric power system for buildings, an electric power system for home use and the like. The customer side electric power system 113 includes a customer side EMS 121, an electric power converter 122, and the stationary power supply 123. The battery pack 40B is installed in the stationary power supply 123. The customer side EMS 121 performs control to stabilize the customer side electric power system 113.

Electric power from the electric power plant 111 and electric power from the battery pack 40A are supplied to the customer side electric power system 113 through the electric power network 116. The battery pack 40B can store electric power supplied to the customer side electric power system 113. Similarly to the electric power converter 118, the electric power converter 122 includes a converter, an inverter, a transformer and the like. Thus, the electric power converter 122 can perform conversion between direct current and alternate current, conversion between alternate currents of frequencies different from each other, voltage transformation (step-up and step-down) and the like. Therefore, the electric power converter 122 can convert electric power supplied to the customer side electric power system 113 into electric power that can be stored in the battery pack 40B.

Note that the electric power stored in the battery pack 40B can be used, for example, for charging a vehicle such as an electric automobile. Also, the system 110 may be provided with a natural energy source. In such a case, the natural energy source generates electric power by natural energy such as wind power and solar light. In addition to the electric power plant 111, electric power is also supplied from the natural energy source through the electric power network 116.

EXAMPLES

Examples are explained below, but the embodiments are not limited to examples described below.

Example 1

(Preparation of Positive Electrode)
As a positive electrode active material, 100 parts by weight of $LiMn_2O_4$ powder was used, and as a conductive agent, 10 parts by weight of acetylene black was used. As a binder, 10 parts by weight of polyvinylidene fluoride (PVdF) was used. Then, the positive electrode active material, the conductive agent, and the binder were added to N-methyl pyrrolidone (NMP) and mixed to prepare a slurry. In addition, the prepared slurry was applied to both sides of the positive electrode current collector. As the positive electrode current collector, a titanium foil having a thickness of 15 μm was used. After the coating film of the slurry was dried, the positive electrode current collector and the coating film were pressed to have an electrode density of 2.5 g/cm³, thereby preparing a positive electrode sheet. The prepared positive electrode sheet was punched out to obtain a positive electrode having a shape of a tab portion of 20 mm×40 mm and an electrode portion of 40 mm×40 mm.

(Preparation of Negative Electrode)

As a negative electrode active material, 100 parts by weight of $Li_4Ti_5O_{12}$ powder was used, and as a conductive agent, 10 parts by weight of acetylene black was used. In addition, as a binder, 10 parts by weight of PTFE was used. Then, a negative electrode active material, a conductive agent, and a binder were added to NMP and mixed to prepare a slurry. The prepared slurry was applied to both sides of the negative electrode current collector. As the negative electrode current collector, a zinc foil having a carbon-containing coating layer with a layer thickness of 1 μm was used, and one with a thickness of 15 μm was used. After the coating film of the slurry was dried, the negative electrode current collector and the coating film were pressed so as to have an electrode density of 2.0 g/cm³, thereby preparing a negative electrode sheet. The prepared negative electrode sheet was punched out to form a negative electrode having a shape of a tab portion of 20 mm×40 mm and an electrode portion of 40 mm×40 mm.

(Formation of Coating Layer on Negative Electrode)

The punched negative electrode was immersed in 2 mM 1H, 1H, 2H, 2H-perfluoro-n-hexylphosphonic acid (FHPA) aqueous solution and heated and dried at 120° C. to obtain a coating layer. The thickness of the coating layer was measured by an ellipsometer (J. A. Woollam Co., Inc., Typ M44) and found to be 2.5 nm. Also, after the electrode mixture layer was separated with ethanol to expose the current collecting foil, the current collecting foil was ultrasonically cleaned with pure water, and the thickness of the coating layer formed on the surface of the current collecting foil was measured. As a result, the thickness of the coating layer on the surface of the current collecting foil was 0.5 nm.

(Preparation of Secondary Battery)

The positive electrode and the negative electrode prepared as described above were alternately laminated to form a stack as an electrode group. In the stack, a separator is interposed between the positive electrode and the negative electrode, and the separator prevents the positive electrode and the negative electrode from coming into direct contact with each other. For the separator, hard filter paper was used to prevent short circuit of the positive electrode and the negative electrode via a liquid such as an electrolyte. In each of the positive electrode and the negative electrode, a terminal was ultrasonically welded to the tab portion. The terminal made of aluminum with its surface anodized was used for the terminal. Further, the stack (electrode group) was housed in a pack made of a laminate film. At this time, the stack was sandwiched by a glass filter, and the stack (electrode group) was made easy to impregnate the electrolyte. As the glass filter, a filter having the same shape as the electrode and having a thickness of 1 mm was used. As the laminate film, a film in which a polypropylene layer was formed on both sides of an aluminum foil having a thickness of 40 μm was used. The thickness of the laminate film was 0.1 mm.

Then, 10 ml of 12M LiCl aqueous solution as an electrolyte was dropped into the prepared electrode group. The electrolyte was injected, the pack of the laminate film was completely sealed by heat sealing. Thus, a laminated cell type aqueous lithium ion battery was fabricated.

(Evaluation)

[Thickness of Coating Layer]

The thickness of the coating layer was measured by, for example, an ellipsometer (J. A. Woollam Co., Inc., Typ M44). The electrode was taken out from the battery, immersed in pure water for 30 minutes, and then vacuum-dried at 80° C. to obtain a measurement sample. For the measurement sample, a xenon arc lamp with a wavelength of 400 to 800 nm was used as a light source, and a spectrum was measured as an average of three points on the sample surface with an incident angle of 75°, and the film thickness was calculated. In the case of measuring the thickness of the coating layer formed at the interface between the current collector and the mixture layer of the electrode, the mixture layer was wiped with ethanol to expose the surface of the current collector to perform measurement. The types of the respective current collectors of the positive electrode and the negative electrode, the organic molecules (coating layer members) used for forming the coating layer, and the thickness of the coating layer according to Example 1 are summarized in Table 1.

[Average Charge/Discharge Efficiency and Capacity Retention Ratio]

The prepared aqueous lithium ion battery was subjected to constant current charge at a charging potential of 2.7 V and a discharging potential of 1.3 V and a current value of 1 C (10 mA in the present example) under an environment of 25° C. Then, after 1.1 h (1.1 hours) has elapsed since the start of charge, based on that a current value is converged to 0.5 C (5 mA in the present example) or smaller, one charge was terminated. When this charge/discharge was repeated 100 times, the average charge/discharge efficiency was 85%, and the capacity retention ratio after 100 cycles was 96%. These evaluations are summarized in Table 2.

The types of the respective current collectors of the positive electrodes and the negative electrodes, the organic molecules (coating layer member) used for forming the coating layer, and the thickness of the coating layers according to each of Examples 2 to 16 are summarized in Table 1, and the average charge/discharge efficiency and the capacity retention ratio are summarized in Table 2. For each of Comparative Examples 1 to 6, the types of the respective current collectors of the positive electrode and the negative electrode, the organic molecules (coating layer member) used for forming the coating layer, and the thickness of the coating layer are summarized in Table 3, and the average charge/discharge efficiency and the capacity retention ratio are summarized in Table 4.

Example 2

Preparation was performed in the same manner as in Example 1 except that the coating layer was formed on the current collecting foil before application of the negative electrode slurry.

Example 3

Preparation was performed in the same manner as in Example 1 except that 10-Carboxydecylphosphonic acid (10-CDPA) was used as the coating layer for the negative electrode.

Example 4

Preparation was performed in the same manner as in Example 3 except that the coating layer was formed on the current collecting foil before application of the negative electrode slurry.

Example 5

Preparation was performed in the same manner as in Example 1 except that the coating layer on the negative electrode was made of $CH_3[CH_2]_{16}COOH$ (stearic acid).

Example 6

Preparation was performed in the same manner as in Example 1 except that the negative electrode active material was niobium titanium oxide $TiNb_2O_7$.

Example 7

Preparation was performed in the same manner as in Example 1 except that the coating layer was formed on the positive electrode and not formed on the negative electrode mixture layer.

Example 8

Preparation was performed in the same manner as in Example 7 except that the coating layer was formed on the current collecting foil before application of the positive electrode slurry.

Example 9

Preparation was performed in the same manner as in Example 8 except that the positive electrode active material was $LiNi_{0.5}Mn_{0.2}Co_{0.3}O_2$.

Example 10

Preparation was performed in the same manner as in Example 9 except that the negative electrode active material was $Li_2NaTi_5NbO_{14}$.

Example 11

Preparation was performed in the same manner as in Example 1 except that the positive electrode active material was $LiMn_2O_4$.

Example 12

Preparation was performed in the same manner as in Example 7 except that the current collector of the positive electrode was made of stainless steel.

Example 13

Preparation was performed in the same manner as in Example 7 except that the positive electrode active material was $LiMn_{0.8}Fe_{0.2}PO_4$ and the coating layer was made of N-(2-aminoethyl)-3-aminopropyltriethoxysilane (AEAPS). At this time, the positive electrode was coated by a solution of 1:7 vol % of AEAPS:toluene in a sealed container at 100° C. for 3 hours.

Example 14

Preparation was performed in the same manner as in Example 1 except that 0.5 mM of 1H, 1H, 2H, 2H-perfluoro-n-hexylphosphonic acid (FHPA) aqueous solution was used.

Example 15

Preparation was performed in the same manner as in Example 1 except that the coating layer was formed on the positive electrode.

Example 16

Preparation was performed in the same manner as in Example 1 except that the coating layer was formed on the positive electrode current collecting foil before application of the positive electrode slurry, and the coating layer was formed on the negative electrode current collecting foil before application of the negative electrode slurry.

Example 17

Preparation was performed in the same manner as in Example 16 except that a 0.5 mM Octadecylphosphonic acid aqueous solution was used.

Comparative Example 1

Preparation was performed in the same manner as in Example 1 except that no coating layer was formed.

Comparative Example 2

Preparation was performed in the same manner as in Example 6 except that no coating layer was formed.

Comparative Example 3

Preparation was performed in the same manner as in Comparative Example 1 except that the positive electrode active material was $LiNi_{0.5}Mn_{0.2}Co_{0.3}O_2$.

Comparative Example 4

Preparation was performed in the same manner as in Comparative Example 3 except that the negative electrode active material was $Li_2NaTi_5NbO_{14}$.

Comparative Example 5

Preparation was performed in the same manner as in Comparative Example 1 except that the positive electrode active material was $LiMn_2O_4$ and the positive electrode current collector was made of stainless steel.

Comparative Example 6

Preparation was performed in the same manner as in Comparative Example 1 except that the positive electrode active material was $LiMn_{0.8}Fe_{0.2}PO_4$.

TABLE 1

| | Positive electrode | | Coating layer of positive electrode | | | |
| | | | Mixture layer surface | | Current collector surface | |
| Example | Active material | Current collector | Coating layer member | Thickness (nm) | Coating layer member | Thickness (nm) |
|---|---|---|---|---|---|---|
| 1 | $LiMn_2O_4$ | Ti | — | — | — | — |
| 2 | $LiMn_2O_4$ | Ti | — | — | — | — |
| 3 | $LiMn_2O_4$ | Ti | — | — | — | — |
| 4 | $LiMn_2O_4$ | Ti | — | — | — | — |
| 5 | $LiMn_2O_4$ | Ti | — | — | — | — |
| 6 | $LiMn_2O_4$ | Ti | — | — | — | — |
| 7 | $LiMn_2O_4$ | Ti | FHPA | 2.5 | FHPA | 0.9 |
| 8 | $LiMn_2O_4$ | Ti | — | — | FHPA | 2.6 |
| 9 | $LiNi_{0.5}Mn_{0.2}Co_{0.3}O_2$ | Ti | — | — | FHPA | 2.6 |
| 10 | $LiNi_{0.5}Mn_{0.2}Co_{0.3}O_2$ | Ti | — | — | FHPA | 2.6 |
| 11 | $LiMn_2O_4$ | Ti | — | — | — | — |
| 12 | $LiMn_2O_4$ | SUS | FHPA | 2.5 | FHPA | 0.9 |
| 13 | $LiMn_{0.8}Fe_{0.2}PO_4$ | Ti | AEAPS | 3.5 | AEAPS | 1 |
| 14 | $LiMn_2O_4$ | Ti | — | — | — | — |
| 15 | $LiMn_2O_4$ | Ti | FHPA | 2.5 | FHPA | 0.9 |
| 16 | $LiMn_2O_4$ | Ti | — | — | FHPA | 2.6 |
| 17 | $LiMn_2O_4$ | Ti | — | — | ODPA | 5 |

| | Negative electrode | | Coating layer of negative electrode | | | |
| | | | Mixture layer surface | | Current collector surface | |
| Example | Active material | Current collector | Coating layer member | Thickness (nm) | Coating layer member | Thickness (nm) |
|---|---|---|---|---|---|---|
| 1 | $Li_4Ti_5O_{12}$ | Zn | FHPA | 2.5 | FHPA | 0.5 |
| 2 | $Li_4Ti_5O_{12}$ | Zn | — | — | FHPA | 2.5 |
| 3 | $Li_4Ti_5O_{12}$ | Zn | 10-CDPA | 3 | 10-CDPA | 0.6 |
| 4 | $Li_4Ti_5O_{12}$ | Zn | — | — | 10-CDPA | 3 |
| 5 | $Li_4Ti_5O_{12}$ | Zn | Stearic acid | 5 | Stearic acid | 0.8 |
| 6 | $NbTi_2O_7$ | Zn | FHPA | 2.3 | FHPA | 0.4 |
| 7 | $Li_4Ti_5O_{12}$ | Zn | — | — | — | — |
| 8 | $Li_4Ti_5O_{12}$ | Zn | — | — | — | — |
| 9 | $Li_4Ti_5O_{12}$ | Zn | — | — | — | — |
| 10 | $Li_2NaTi_5NbO_{14}$ | Zn | — | — | — | — |
| 11 | $Li_4Ti_5O_{12}$ | Ti | FHPA | 2.3 | FHPA | 0.4 |
| 12 | $Li_4Ti_5O_{12}$ | Zn | — | — | — | — |
| 13 | $Li_4Ti_5O_{12}$ | Zn | — | — | — | — |
| 14 | $Li_4Ti_5O_{12}$ | Zn | FHPA | 1.5 | FHPA | 0.5 |
| 15 | $Li_4Ti_5O_{12}$ | Zn | FHPA | 2.5 | FHPA | 0 5 |
| 16 | $Li_4Ti_5O_{12}$ | Zn | — | — | FHPA | 2.5 |
| 17 | $Li_4Ti_5O_{12}$ | Zn | — | — | ODPA | 5 |

TABLE 2

| | Positive electrode | | Coating layer of positive electrode | | | |
| | | | Mixture layer surface | | Current collector surface | |
| Comp. Example | Active material | Current collector | Coating layer member | Thickness (nm) | Coating layer member | Thickness (nm) |
|---|---|---|---|---|---|---|
| 1 | $LiMn_2O_4$ | Ti | — | — | — | — |
| 2 | $LiMn_2O_4$ | Ti | — | — | — | — |
| 3 | $LiNi_{0.5}Mn_{0.2}Co_{0.3}O_2$ | Ti | — | — | — | — |
| 4 | $LiNi_{0.5}Mn_{0.2}Co_{0.3}O_2$ | Ti | — | — | — | — |
| 5 | $LiMn_2O_4$ | SUS | — | — | — | — |
| 6 | $LiMn_{0.8}Fe_{0.2}PO_4$ | Ti | — | — | — | — |

TABLE 2-continued

| | | | Coating layer of negative electrode | | | |
| | Negative electrode | | Mixture layer surface | | Current collector surface | |
| Comp. Example | Active material | Current collector | Coating layer member | Thickness (nm) | Coating layer member | Thickness (nm) |
|---|---|---|---|---|---|---|
| 1 | $Li_4Ti_5O_{12}$ | Zn | — | — | — | — |
| 2 | $NbTi_2O_7$ | Zn | — | — | — | — |
| 3 | $Li_4Ti_5O_{12}$ | Zn | — | — | — | — |
| 4 | $Li_2NaTi_5NbO_{14}$ | Zn | — | — | — | — |
| 5 | $Li_4Ti_5O_{12}$ | Zn | — | — | — | — |
| 6 | $Li_4Ti_5O_{12}$ | Zn | — | — | — | — |

TABLE 3

| Example | Average charge/discharge efficiency(%) | Capacity retention ratio after 100 cycles(%) |
|---|---|---|
| 1 | 78 | 88 |
| 2 | 85 | 96 |
| 3 | 75 | 88 |
| 4 | 79 | 90 |
| 5 | 75 | 85 |
| 6 | 80 | 86 |
| 7 | 80 | 88 |
| 8 | 82 | 92 |
| 9 | 84 | 89 |
| 10 | 79 | 85 |
| 11 | 81 | 92 |
| 12 | 78 | 82 |
| 13 | 72 | 88 |
| 14 | 82 | 93 |
| 15 | 82 | 89 |
| 16 | 88 | 96 |
| 17 | 92 | 97 |

TABLE 4

| Comp. Example | Average charge/discharge efficiency(%) | Capacity retention ratio after 100 cycles(%) |
|---|---|---|
| 1 | 62 | 80 |
| 2 | 56 | 75 |
| 3 | 60 | 73 |
| 4 | 55 | 70 |
| 5 | 49 | 71 |
| 6 | 52 | 78 |

In comparison between Examples and Comparative Examples, it is found that both the average charge/discharge efficiency and the capacity retention ratio are excellent in Examples than Comparative Example. Among Examples, in comparison between Example 1 and Example 2, between Example 3 and Example 4, and between Example 7 with Example 8, it is found the average charge/discharge is excellent when the coating layer is present only on the surface of the current collector. This is thought to be due to the fact that by forming a relatively thick coating layer on the surface of the current collector, a great effect was obtained in corrosion of the current collector and prevention of aqueous solvent decomposition on the surface of the current collector. Further, in comparison between Examples 1 and 14, it is thought that, by covering only the surface of the active material, a certain effect can be obtained, but by reducing the coating thickness and reducing the resistance to deinsertion of Li, a greater effect is exerted on improvement and retention ratio improvement.

The present disclosure also encompasses the following approaches.

(1)

An electrode including:

a current collector; and an electrode mixture layer disposed at a surface of the current collector, wherein the electrode includes a self-assembled film of organic molecules on at least a part of the surface of the current collector.

(2)

The electrode according to clause 1, wherein the self-assembled film is formed of an organic molecule having a structure represented by (Formula 1).

$$R\text{—}XO_n \qquad \text{(Formula 1)}$$

(n=0, 1, 2, 3, R is a carbon chain or one having a reactive functional group at the terminal of the carbon chain, and X includes at least one of Si, P, N, and C)

(3)

The electrode according to clause 2, wherein the carbon chain R of the organic molecule contains fluorine.

(4)

The electrode according to any one of clauses 1 to 3, wherein the self-assembled film is further formed on at least a part of a surface of the electrode mixture layer.

(5)

The electrode according to any one of clauses 1 to 4, wherein a thickness of the self-assembled film measured with an ellipsometer is 0.4 nm or greater and 5 nm or smaller.

(6)

A secondary battery including:

a positive electrode;

a negative electrode; and an aqueous electrolyte, wherein at least one of the positive electrode and the negative electrode is the electrode according to any one of clauses 1 to 5.

(7)

The secondary battery according to clause 6, containing, as a negative electrode active material in the negative electrode, any one or more of titanium composite oxides containing at least any one or more selected from the group consisting of titanium oxide, lithium-titanium oxide having a spinel structure, niobium-titanium composite oxide, and orthorhombic Na-containing niobium-titanium composite oxide.

(8)

A battery pack including the secondary battery according to clause 6 or 7.

(9)

The battery pack according to clause 8, further including an external power distribution terminal and a protective circuit.

(10)

The battery pack according to clause 8 or 9, which includes plural of the secondary battery and the plural of the secondary battery are electrically connected in series, in parallel, or in combination of series and parallel.

(11)

A vehicle including the battery pack according to any one of clauses 8 to 10.

(12)

The vehicle according to clause 11, which includes a mechanism configured to convert kinetic energy of the vehicle into regenerative energy.

(13)

A stationary power supply including the battery pack according to any one of clauses 8 to 10.

(14)

An electrode including:
a current collector; and
an electrode mixture layer disposed at a surface of the current collector,
wherein the electrode includes a monomolecular film of organic molecules on at least a part of the surface of the current collector.

(15)

An electrode including:
a current collector; and
an electrode mixture layer disposed at a surface of the current collector,
wherein the electrode includes an organic molecular film with a structure represented by (Formula 1) on at least a part of the surface of the current collector.

$$R-XO_n \qquad \text{(Formula 1)}$$

(n=0, 1, 2, 3, R is a carbon chain or one having a reactive functional group at the terminal of the carbon chain, and X includes at least one of Si, P, N, and C).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode comprising:
a current collector;
a first self-assembled film containing organic molecules and covering at least a part of a surface of the current collector; and
an electrode mixture layer disposed on at least a part of a surface of the first self-assembled film,
wherein the organic molecules include at least one of a first structure and a second structure,
wherein the first structure is represented by $$R-XO_n,$$

R being a first carbon chain structure or a second carbon chain structure having a terminal functional group, X being P, N, and/or C, and n being 0, 1, 2, or 3, and
wherein the second structure represented by formula (1)

$$A-R_1-B \qquad (1)$$

A being a carboxyl group, a fluoroalkyl group, a phosphonic acid group, or an amino group, the $R_1$ being represented by a being 3 or larger and 17 or smaller, b being 1 or larger and 35 or smaller, and B being a carboxyl group or a phosphonic acid group.

2. The electrode according to claim 1, wherein the organic molecules include the first structure.

3. The electrode according to claim 1, wherein the first carbon chain structure or the second carbon chain structure contains fluorine.

4. The electrode according to claim 1, wherein the organic molecules include the second structure.

5. The electrode according to claim 1, wherein a thickness of the first self-assembled film according to an ellipsometer is 0.4 nm or greater and 5 nm or smaller.

6. The electrode according to claim 1, further comprising a second self-assembled film that covers at least a part of a surface of the electrode mixture layer and faces the first self-assembled film via the electrode mixture layer.

7. The electrode according to claim 6, wherein a thickness of the second self-assembled film according to the ellipsometer is 0.4 nm or greater and 5 nm or smaller.

8. The electrode according to claim 1, wherein the organic molecules contain at least one selected from the group consisting of 1H, 1H, 2H, 2H-perfluoro-n-hexylphosphonic acid, 10-carboxydecylphosphonic acid, stearic acid, and octadecylphosphonic acid.

9. The electrode according to claim 1, wherein the organic molecules include the first and the second structure.

10. The electrode according to claim 1, wherein the organic molecules include the second structure, and A is a carboxyl group.

11. The electrode according to claim 1, wherein the organic molecules include the second structure, and A is a fluoroalkyl group.

12. The electrode according to claim 1, wherein the organic molecules include the second structure, and A is a a phosphonic acid group.

13. A secondary battery comprising:
a positive electrode;
a negative electrode; and
an aqueous electrolyte,
wherein at least one of the positive electrode and the negative electrode includes the electrode according to claim 1.

14. The secondary battery according to claim 13, wherein the negative electrode comprises a negative electrode active material including at least one compound selected from the group consisting of titanium oxide, lithium-titanium oxide having a spinel structure, niobium-titanium composite oxide, and orthorhombic Na-containing niobium-titanium composite oxide.

15. A battery pack comprising the secondary battery according to claim 13.

16. The battery pack according to claim 15, further comprising an external power distribution terminal and a protective circuit.

17. The battery pack according to claim 15, which includes plural of the secondary battery and the plural of the secondary battery are electrically connected in series, in parallel, or in combination of series and parallel.

18. A vehicle comprising the battery pack according to claim 15.

19. The vehicle according to claim 18, further comprising a mechanism which converts kinetic energy of the vehicle into regenerative energy.

20. A stationary power supply comprising the battery pack according to claim 15.

\* \* \* \* \*